(12) United States Patent
Wallace

(10) Patent No.: US 10,480,990 B1
(45) Date of Patent: Nov. 19, 2019

(54) SYSTEM AND METHOD FOR DYNAMIC ADJUSTMENT OF RECIPE INGREDIENTS

(71) Applicant: Perfect Company, INC., Vancouver, WA (US)

(72) Inventor: Michael Wayne Wallace, Vancouver, WA (US)

(73) Assignee: Perfect Company, Vancouver, WA (US)

( * ) Notice: Subject to any disclaimer, the term of this patent is extended or adjusted under 35 U.S.C. 154(b) by 175 days.

(21) Appl. No.: 15/625,643

(22) Filed: Jun. 16, 2017

(51) Int. Cl.
| | | |
|---|---|---|
| *G09B 5/02* | (2006.01) | |
| *G09B 5/04* | (2006.01) | |
| *G09B 19/00* | (2006.01) | |
| *G01G 19/414* | (2006.01) | |
| *G01G 23/37* | (2006.01) | |

(52) U.S. Cl.
CPC ....... *G01G 19/414* (2013.01); *G01G 23/3742* (2013.01); *G09B 5/02* (2013.01); *G09B 5/04* (2013.01); *G09B 19/0092* (2013.01)

(58) Field of Classification Search
CPC ............ G01G 19/414; G01G 19/4146; G01G 23/3742; G09B 5/02; G09B 5/04; G09B 19/0092
See application file for complete search history.

(56) References Cited

U.S. PATENT DOCUMENTS

| | | | | |
|---|---|---|---|---|
| 4,807,169 | A * | 2/1989 | Overbeck | A47J 27/14 708/133 |
| 4,840,239 | A * | 6/1989 | Slagg | G01G 15/001 177/1 |
| 6,978,221 | B1 * | 12/2005 | Rudy | G01G 19/4146 128/921 |
| 8,829,365 | B1 * | 9/2014 | Wallace | G06F 13/382 177/25.13 |
| 9,364,106 | B1 * | 6/2016 | Ortiz | A47G 19/025 |
| 2009/0164933 | A1 * | 6/2009 | Pederson | G05B 19/409 715/772 |
| 2015/0305564 | A1 * | 10/2015 | Jimenez | A47J 43/046 366/141 |
| 2018/0272300 | A1 * | 9/2018 | Wallace | A47J 43/046 |

\* cited by examiner

*Primary Examiner* — Randy W Gibson
(74) *Attorney, Agent, or Firm* — Lee & Hayes, P.C.

(57) ABSTRACT

A system and method directed to dynamic ingredient adjustment for nutrition-based recipe ingredient modification is described. The recipe ingredient modification can be based on the amount of one or more ingredients, nutrition content of the ingredients, ingredient availability, total nutritional content of an entire recipe or on a per serving size, and amount, kind, and nutrition content of any substitute ingredient used. A recipe's at least one nutritional content or value (for example, amount of fiber or total fat in gram or percentage) can be adjusted in approximately real-time while processing or measuring the ingredients on a smart scale. The system's dynamic scaling capability also provides for the substitution of ingredients or the adjustment of the quantity of ingredients even when a user is already in the middle of processing, mixing, or adding one or more ingredients based on predetermined ingredients and quantities provided in a recipe.

16 Claims, 17 Drawing Sheets

SYSTEM AND METHOD FOR DYNAMIC ADJUSTMENT OF RECIPE INGREDIENTS

BACKGROUND

Generally, recipes are based on predetermined portions of ingredients. The weight of ingredients is a common form of measuring the ingredients. There also are systems directed to the process of making recipes. One example of these systems includes a scale that is calibrated to weigh ingredients using minute increments, such as a leaf of an herb or grains of salt. The precision offered by such scales also can afford an advantage over traditional scales. Higher precision measurement supports a more accurate and comprehensive assessment of the nutritional information for the recipes.

Some scales also can display an indication of the weights of ingredients as the individual ingredients are added to a container in which they can be combined. Still, further, these scales can support changes to the serving size of recipes. When a recipe is scaled, such as, for example, from 1 serving to 3 servings or from 1 serving to ½ serving, the weight of each of the ingredients also can be changed in the recipe according to the new serving size. Then, the scale can indicate when the new weight is measured on the scale.

At the same time, some users of recipes can identify individual or combinations of ingredients in recipes for adjustments such that the predetermined amounts of individual ingredients also can be altered, without changing other ingredients that are not specifically identified for adjustment. These adjustments will change the nutritional information relative both to the adjusted individual ingredient(s) and also to full nutritional information for the recipe in a different manner than occurs when scaling a recipe. Whereas scaling involves proportional changes made to all ingredients resulting in a linear change to the overall nutritional information, independent adjustment of one ingredient need not impact the predetermined recipe amount of other ingredients or the proportional relationship of the other ingredients relative to each other. Therefore, there is a need for systems and processes for adjusting independently individual or combinations of ingredient(s) of recipes, substituting one ingredient for another, or doing so based on nutritional data and/or providing nutritional data about the adjusted ingredient(s) and the impact on the overall nutritional information for the recipe.

Figure 1:
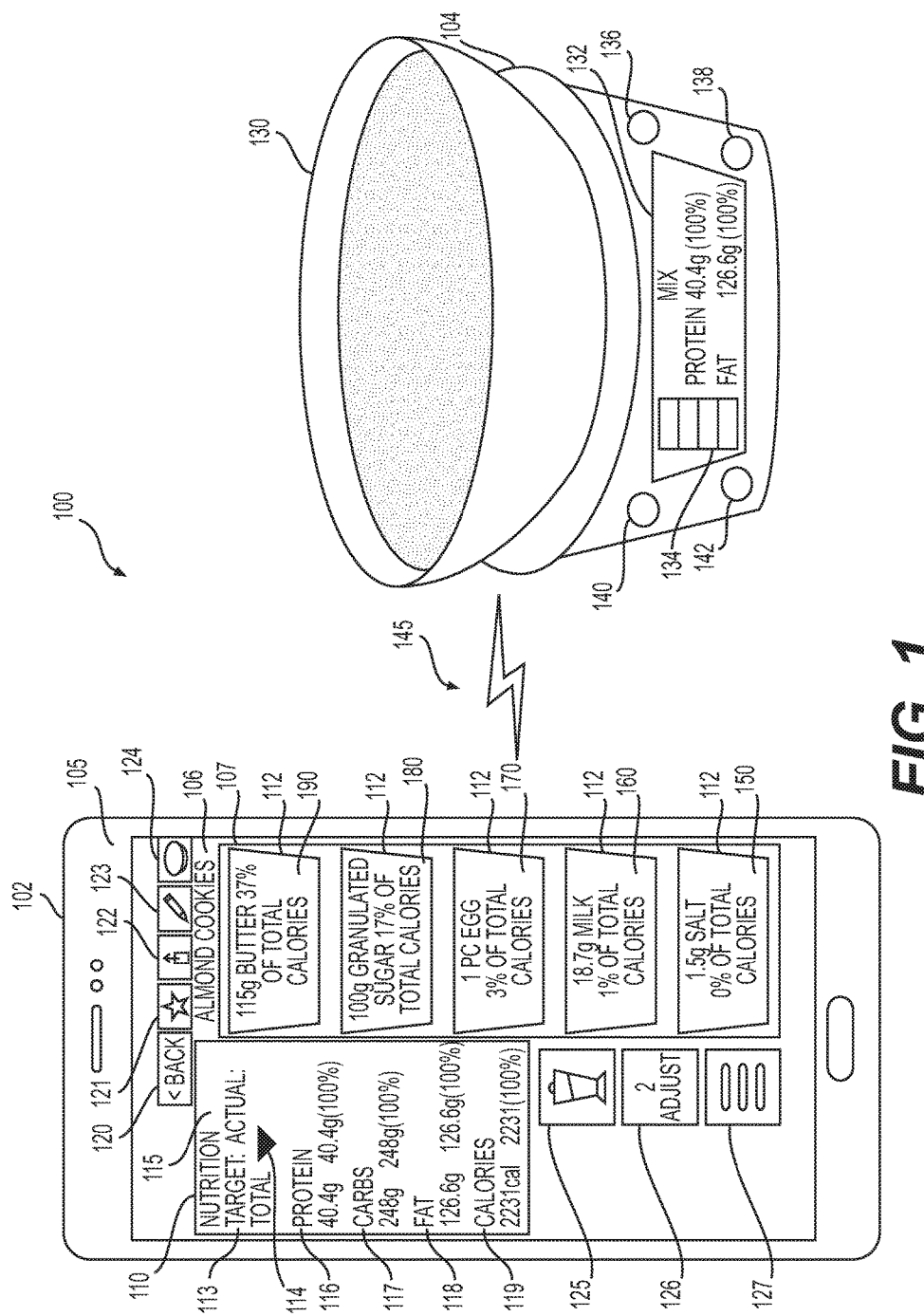
FIG. 1 is an illustrative example of a system that shows a client-computing device and a smart scale.

While implementations are described herein by way of example, those skilled in the art will recognize that the implementations are not limited to the examples or drawings described. The drawings and detailed description thereto are not intended to limit implementations to the particular form disclosed but, on the contrary, the intention is to cover all modifications, equivalents and alternatives falling within the spirit and scope as defined by the appended claims.

When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

The headings used herein are for organizational purposes only and are not meant to be used to limit the scope of the description or the claims. As used throughout this application, the word "can" is used in a permissive sense (i.e., meaning having the potential to), rather than the mandatory sense (i.e., meaning must). Similarly, the words "include," "including," and "includes" mean including, but not limited to. In addition, use of directional terms such as "upper," "lower," "above," "underneath" or similar, are intended to describe the positions and/or orientations of various components of the invention relative to one another as shown in the various figures and are not intended to impose limitations on any position and/or orientation of any embodiment of the invention relative to any reference point external to the reference.

DETAILED DESCRIPTION

Examples of the present disclosure are directed to, among other things, methods and systems for generating, by a smart scale, amounts of individual or combinations of ingredients detected during execution of recipes, including adjustment to ingredient(s) compared to the target amounts presented in the recipe for the ingredient(s), and displaying nutritional information about the individual ingredients and the complete recipe. The term "execution" or "execute" as used herein, includes making a recipe or adding an ingredient as part of making a recipe. The adjustments can be performed for individual ingredient(s), including one ingredient or a combination of ingredients.

Ingredient adjustments can include a number of different types of adjustments. One example is a substitution that can be implemented automatically for all recipes (for example, based on a program applied against recipes entered or selected). Alternatively or additionally, a substitution can be performed on an individual-by-individual ingredient basis. A substitution also can be performed based on a manual substitution where the user selects the ingredient to be substituted at the outset of the recipe or at any time prior to starting to add the ingredient to the scale as the recipe is executed. In other examples, these types of ingredient adjustments can be combined and multiple types of ingredient adjustments can be applied to individual ingredients or a combination of ingredients. One example is where an ingredient substitution is followed by an adjustment to the amount of the ingredient through preselecting an adjusted amount or adding less or more than the targeted amount of the ingredient as predetermined in the recipe.

The methods and systems provide adaptability, flexibility, and convenience, as well as prevent or minimize waste. In some examples, adjustments are based on preset adjustments to recipe ingredient(s) for a class of recipes or users or the use of substitutions, such as based on dietary preferences, or dynamically as the ingredient(s) are being added during making the recipe to adjust ingredient(s) downward or upward. There are myriad advantages to the adjustment of recipe ingredient(s), including in some examples, at the beginning of a recipe preparation for one or a combination of ingredient(s) on an automated or manual basis, or when adjustment is performed in the middle of an already ongoing process of making the recipe. In additional examples, adjustment(s) to individual or combinations of ingredients of a recipe can be based on the nutritional content of one or more recipe ingredients, ingredient availability, the impact of the recipe ingredient adjustment on the total nutritional content of a complete recipe per given serving size, and/or the amount and nutrition content of any substitute ingredient used. The system also can allow for a quick and straightforward way to substitute ingredients or to modify the amount of individual ingredients even when a user is already in the middle of processing, mixing, or adding one or more ingredient(s). There are a variety of potential bases for altering individual ingredients, such as medical diagnoses, dietary preferences, geographical effects on the selection, use or cooking process relative to individual ingredients, other health bases, economic, dietary restrictions, preference or convenience factors, and/or any one or more of the senses such as taste, smell, touch, appearance or similar. In these examples, users can make a decision to change an individual ingredient or combinations of ingredients independent of the predetermined amounts or proportions of ingredients in the recipe. The system affords convenience for a decision either prior to executing the recipe or during recipe execution, such as when a user changes his or her mind and decides to adjust one or more ingredient amounts (sometimes measured in weight, volume or other measurement approaches).

The system 100 provides for various functionalities, operations, or actions involving a recipe. For example, a user can select, retrieve, input, modify or receive the desired recipe and/or one or more individual ingredients or combinations of ingredients related to the recipe or as substitute ingredients for the recipe or for recipes generally (for example, in order to identify dietary preferences that can be used for a substitution filter to be applied to a particular recipe or recipes in general) to be displayed on a display device. A user can enter a name for the recipe and/or one or more individual ingredients or combinations of ingredients to be edited or stored; enter a textual summary of the recipe, one or more individual ingredients or combinations of ingredients; add comments, alerts, warnings, images, graphic symbols, icons, or video on the recipe, one or more individual ingredients or combinations of ingredients; select a storage location; schedule an automated display; and perform other actions relating to a recipe, one or more individual ingredients, or combinations of ingredients. A smart app user interface can be configured to allow a user to electronically navigate to the desired recipe, one or more individual ingredients or combinations of ingredients; input the name of the desired recipe, one or more individual ingredients or combinations of ingredients; select the desired recipe or ingredient from among a list of displayed items; search by entering a textual description of the desired recipe or ingredient; search for other recipes or ingredients containing similar total nutritional value or ingredients; and perform other actions involving a selected recipe or one or more individual ingredients or combinations of ingredients.

A selected recipe or one or more ingredients can be presented to a user in various ways via user-selectable options provided on or by a smart app. For example, a recipe or one or more ingredients can be presented to a user via one or more formats that include text, video, graphics, audio, and text. The recipe or one or more ingredients can be displayed such that the desired amount of information is visible on a display field at the same time. A system display can also be configured such that a user can navigate from one recipe or one or more ingredients, to the next, or from one display page to another, using, for example, a gesture, control button, or key on a touch-sensitive display. In another example, a user can issue voice commands or queries to the system to allow the user to prepare a dish based on a retrieved recipe without having to always look at a display of a smart scale or a client computing device.

FIG. 1 is an illustrative example of a system 100 that shows a client computing device 102 and a smart scale 104. The client computing device 102 shows a user interface 105 for a smart app installed on the client computing device 102. The user interface 105 also shows the name of the recipe 106, i.e., "Almond Cookies," a nutritional panel 110 shown on the left-hand side of the user interface 105 and a recipe column 107 including a series of recipe ingredient blocks 112 comprising the list of ingredients as visual blocks. Various portions of the display can be rearranged or omitted based on the amount of nutritional information sought to be displayed relative to the adjustment to individual ingredients and the impact of the individual adjustments to the total nutrition of the recipe. In this example, selected ingredients from the "Almond Cookie" recipe 106 for illustration purposes are shown, with the full ingredient list being provided and described further in FIGS. 6 and 8A-8B. While the additional ingredients are not shown in FIG. 1, they can be presented as additional blocks 112 which can be presented in the recipe column 107 in a scrolling manner as the successive ingredients are the next ingredient for the recipe 106 execution.

The system's 100 dynamic ingredient adjustment feature provides significant advancements in utilizing precision scales, such as smart scale 104, and technology assistance in making a recipe. In one example, when an ingredient adjustment is made, the user interface 105 can display the new nutritional information regarding the ingredient on the nutritional panel 110 as well as the nutritional information for the entire recipe. The new information can include updated data for the actual amount of the ingredient versus the target amount of the ingredient.

The nutritional panel 110 can include two nutrition information columns. The left-hand column, with the header "Target" 113, can include data for the target nutritional information of either one of the individual ingredients or the total nutritional information for the complete recipe 106, depending on the selection using the data entry field 114. The data entry field 114 supports a drop-down box, scroll function or other data selection entry (as discussed further below regarding FIG. 3B) for either the complete recipe 106 or one of the ingredients listed in a recipe column 107 for the ingredients of the recipe 106. The ingredients can be presented in a series of recipe ingredient blocks 112. The data entry field 114 currently shows "Total" with the additional options (not shown in FIG. 1; as shown and described further below regarding FIG. 3B). The right-hand column, with the header "Actual" 115, can include data associated with the actual amounts of nutrients detected by the scale 104 based on a weight measurement of each ingredient, expressed in terms of weight in grams or in calories, and the corresponding percentage measured relative to the target nutrition amount 113. The nutrition information for each of the target nutrition 113 and the actual nutrition 115 can include nutritional information for categories such as protein 116, carbohydrates 117 (shown as "Carbs"), fat 118, and the number of calories 119, as well as other categories of nutritional information. In the recipe column 107, each of the ingredients specified in the recipe 106 are shown in the recipe ingredient blocks 112. The blocks 112 also can include an indication of the predetermined amounts or weights specified in the original recipe 106. Upon making the recipe 106 such that the ingredients are measured on the scale 104, the blocks 112 can also be visually altered to show the weight data from the scale 104 as it measures the ingredient. Initially, the blocks 112 can display the same nutritional data as the target nutrition 113, and the percentages for each nutritional category consequently are 100%. In addition, the nutritional panel 110 can display data based on the total recipe 106 or individual ingredients selected using the data entry field 114. In further examples, the panel 110 can display data while the scale 104 is operating to take weight measurements of individual ingredients as the recipe is made. As an ingredient is being added, the data entry field 114 can change to show the actual ingredient, and the nutrition panel 110 can display data relevant to that ingredient in an approximately real-time manner. In other examples, the system 100 can support customization of the data displayed in the recipe ingredient blocks 112 and the nutritional panel 110.

In some examples, the user interface 105 shows various buttons and options such as a back button 120, a favorite button 121, a share button 122, an edit button 123 and a smart scale connection status indicator 124. These buttons provide the user with options for redirecting the processing to an earlier step with the back button 120, setting a recipe as a favorite with the favorite button 121, sharing a recipe with the share button 122 and editing portions of a recipe with the edit button 123, and indicating whether the smart scale 104 is connected to the client computing device 102. Additional user interface 105 function buttons are shown in the lower left, including an action button 125, an ingredient adjustment button 126 and a menu button 127.

An ingredient adjustment button 126 can show the current number of servings for the complete recipe 106 and also, upon activation, direct the user to a different interface or an expanded ingredient adjustment screen on the current interface 105 in order to support the user in identifying individual or combinations of ingredients in recipes, to select or input substitute ingredients for recipe ingredients and to preselect adjustments in the amount(s) of ingredient(s) such as for scaling the recipe for a different number of servings. The expanded ingredient adjustment screen, also referred to as the adjust panel 1010 is shown and further described below regarding FIGS. 10A-10C.

The action button 125 can provide the user with an option to start a timer for blending the ingredients that have been placed inside a container 130 detected by the scale 104. In other examples, the scale 104 can be incorporated into a blender (not shown) so that the action button can operate a blender upon activation of the action button 125, or in additional examples, the action button 125 can direct the user to a mixing interface (not shown) that allows selection or entry of mixing duration and other settings for ingredient mixing. The menu button 127 can redirect the user to other screens of the smart app 202.

The smart scale 104 includes a display interface 132 that shows the amount of ingredients as they are added to the container 130 and an action to be executed for the current ingredient being added or to be added next (in this example, the action is "Mix"). The display interface 132 also can show nutritional information, including content and recipe 106 ingredient information, including a portion or all of the categories and data shown in the nutritional panel 110, or as customized by the user. In this example, a portion of the data from the nutritional panel 110 is shown, including nutritional categories protein and fat (the data is the same as the amounts shown where "Total" has been selected in the selection 114 for the target nutrition 113 and the actual nutrition 115 as in this example, the recipe 106 is completed and the final ingredient has been added to the container). The display 132 can provide ingredient and nutritional information on a per ingredient basis in other examples, and the display can be customized by the user by accessing, for example, the customization module 212 shown in FIG. 2. The display 132 also can include a progress bar 134 that indicates the current amount of ingredient already added into the smart scale 104. The smart scale 104 can also provide programmable or predefined hardware buttons for enabling various options such as an Up button 136, Down button 138, Power button 140, and a Bluetooth button 142, among others.

Figure 6:
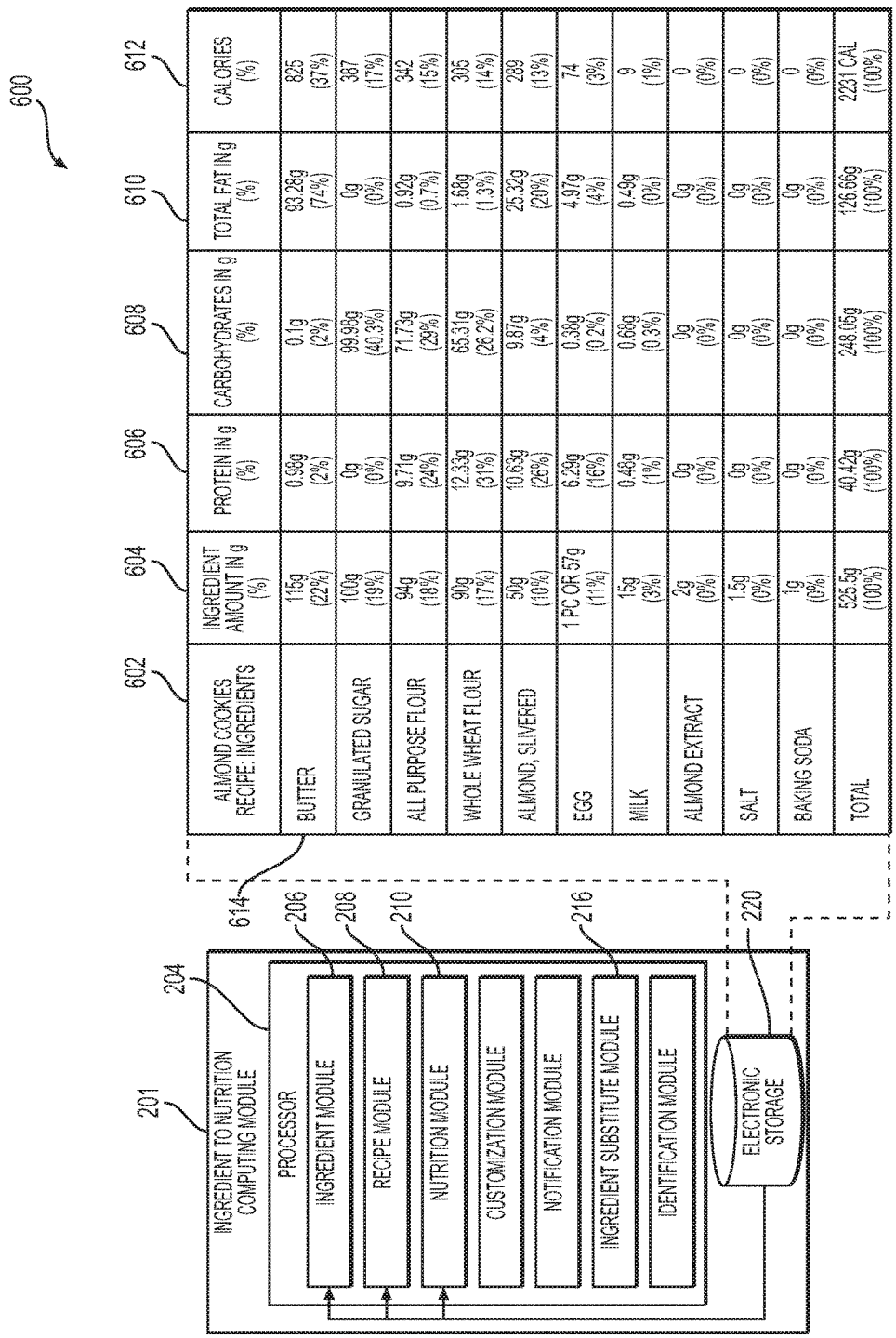
FIG. 6 is a nutrition information table for an exemplary recipe.
Figure 8A:
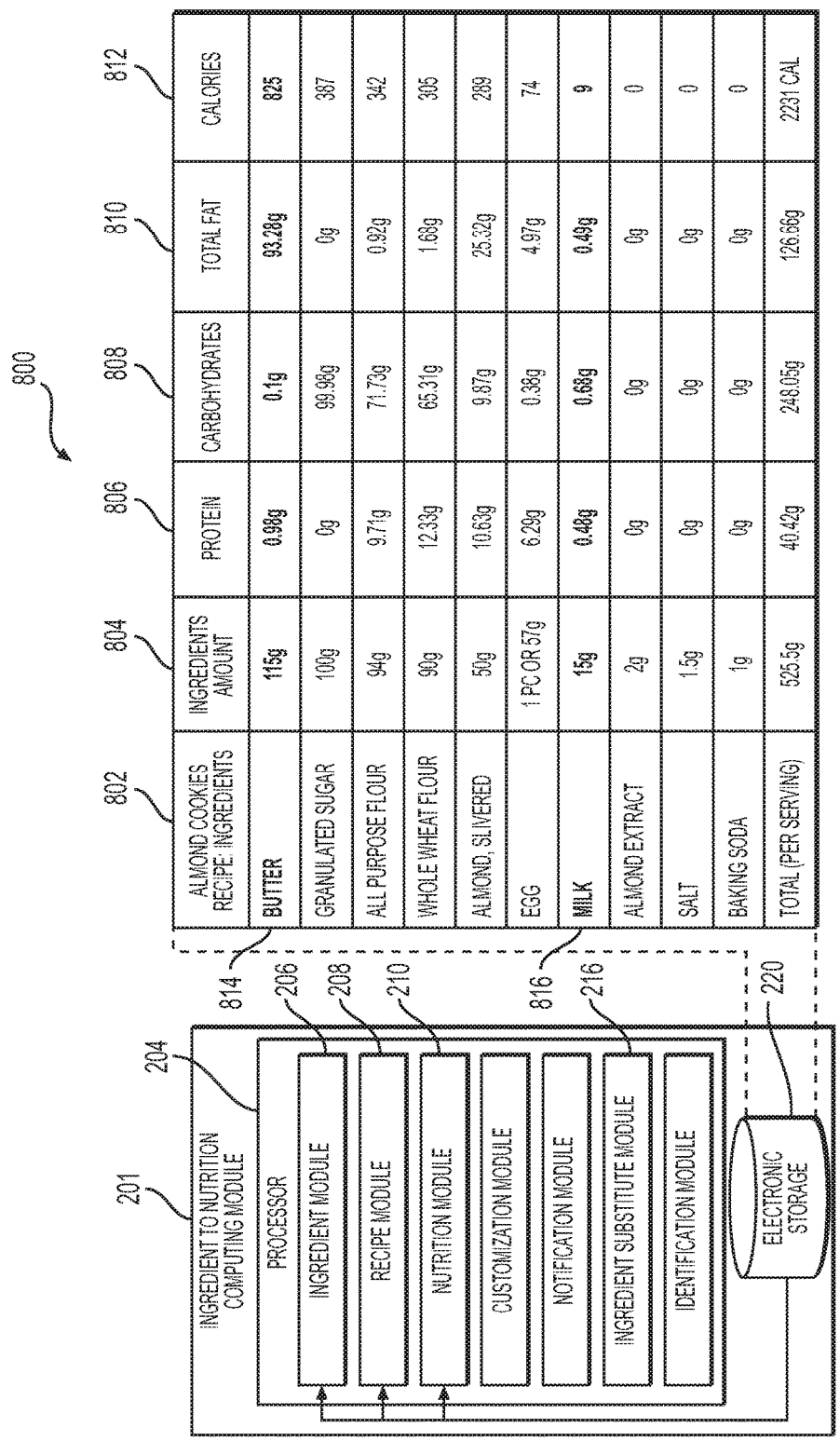
FIGS. 8A-8B depict two ingredient tables for the recipe.
Figure 8B:
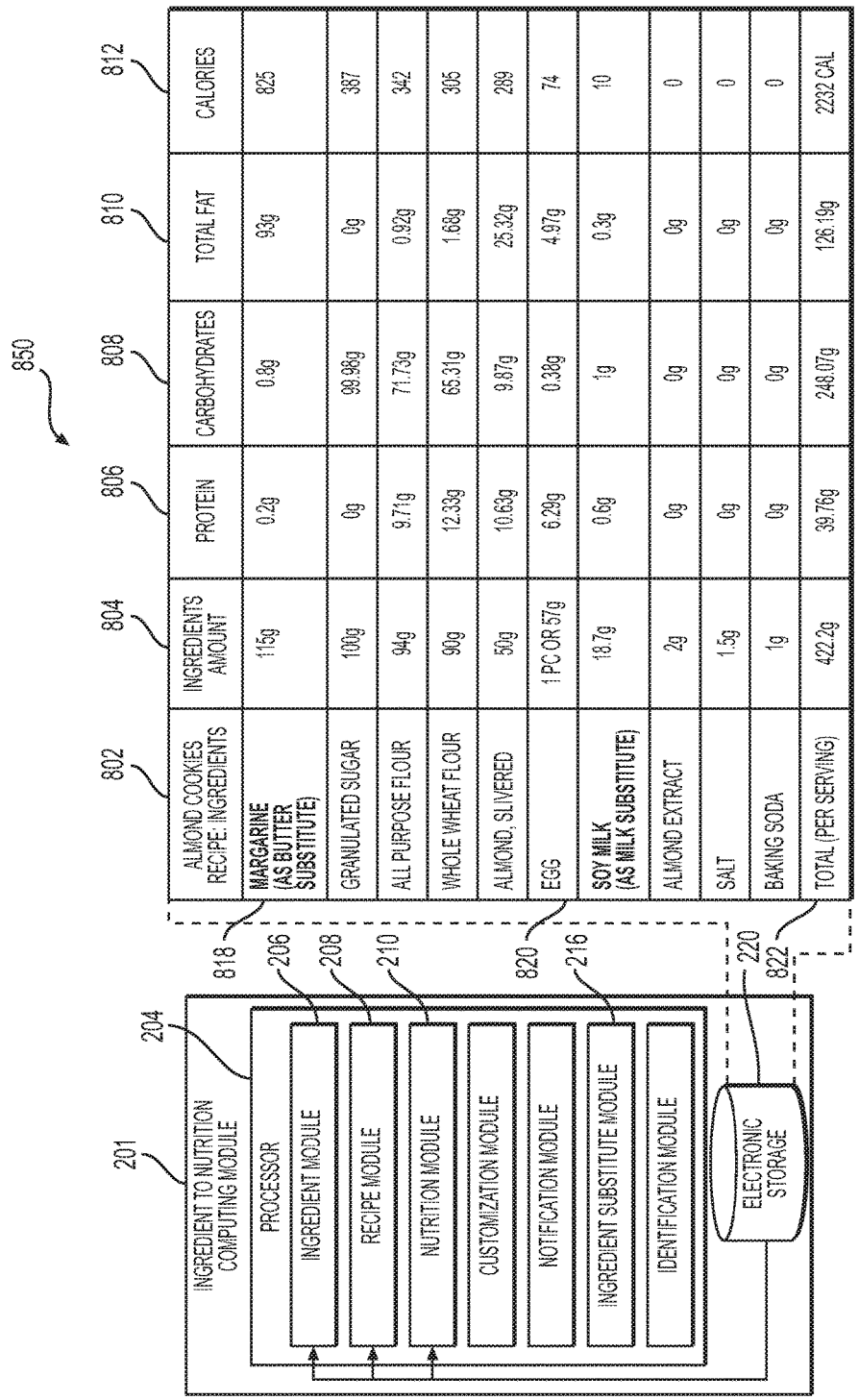

The "Almond Cookie" recipe 106 can include the recipe column 107, including the recipe ingredient blocks 112 containing one or more of visual, textual, audio and/or video information about each ingredient, such as shapes, a listing of each ingredient and/or nutritional information. For example, in FIG. 1, the following ingredients are listed in the recipe ingredient blocks 112: salt ingredient 150, milk ingredient 160, egg ingredient 170, granulated sugar ingredient 180 and butter ingredient 190. The display can also provide a dynamic movement of its contents, such as scrolling through ingredients for the recipe 106 where providing ingredient information for a number of recipe ingredients lends itself to a scrolling or movement function to optimize the data provided per ingredient. In this example, the ingredients 150, 160, 170, 180 and 190 shown are a portion of the recipe's complete ingredients (as shown in FIGS. 6 and 8A-8B). In addition, in this example, further information is provided in the recipe ingredient blocks 112, weight or unit, as well as percentage contribution of each ingredient to the recipe 106 total nutritional information for total calories, as shown in the recipe ingredient blocks 112 for ingredients 150, 160, 170, 180 and 190. The system 100 can include options for the user to select from predetermined features of display 105, or to customize features, so that a variety of nutritional information can be highlighted in the recipe ingredient blocks 112, and the display 105 can include data selection options to change the display 105 to present different information during recipe 106 execution. In addition, the recipe column 107 can include functionality to highlight the current ingredient being added, as well as changes to the display to visually present the addition of ingredients, as shown and described regarding FIGS. 3A-3B. This functionality is one of a variety of approaches supported by the system 100 to enable a user to view nutritional information and feedback about the impact of each individual ingredient during the process of adding the ingredient to the container 130. Data is measured and provided to the system 100 on an approximately real time basis. The presentation of ingredient additions and resulting changes on an approximately real time basis of the nutritional information in the nutritional panel 110 supports users to make approximately real time adjustments to ingredient(s).

Nutritional information can be part of the information content of a recipe. The nutritional information can include information on number of calories, as well as the weight or percent of a vitamin, mineral, fat, fatty acid, sugar, or similar, for a given amount of an ingredient or serving size of a recipe. A user can utilize nutritional information when searching for a recipe. The user can input a nutritional value such as a target or desired total amount of protein, calcium, fiber, or similar, as a recipe filtering criterion for selecting from among many recipes saved in, for example, a local or online database. The displayed nutritional information for a recipe can also include information relating to daily dietary recommendations such as those based on recommended daily allowance (RDA), as well as those that relate to food allergens (for example, peanuts, shellfish, and milk, among others) and specific diets such as vegetarian, vegan, gluten-free, kosher, high-fat, low-fat, or high-carbohydrate diets. In one example, the system can determine if one or more ingredients in a recipe (for example, peanut oil) are known allergens and can alert a user to the presence of the allergens when the user views the recipe. In some instances, the system may store data associated with the user's sensitivity to certain foods or allergens and provide an alert or a warning when these foods or allergens are present in a recipe.

The smart scale 104 and the client computing device 102 can have one or more processors configured to execute various functions, operations, commands, functionalities, processes, and computer modules. In other examples, the system 100 can utilize other devices or locations for executing various functions, including for example, receiving data from the smart scale 104 and processing the data to provide ingredient adjustment support, to calculate the resulting impact on the total nutrition of recipes, and to calculate and display a comparison between the nutrition of the target ingredient (as specified in the recipe 106) and the nutrition of the actual ingredient measured by the smart scale 104. Such other devices can include processors remotely accessible by the smart scale 104, such as additional device(s) that can communicate with the scale, a user interface 105 integrated into the scale 104 or as part of another device independent of the scale 104. The scale 104 also can include a portion or all the processing capabilities, or the processing can occur on the basis of a distributed network with portions of or full processing implemented in one or more server(s), which are distributed within a network between remote devices. One example of a communications channel is shown in FIG. 1 as a network 145.

The smart scale 104 further can also include notification or feedback systems in the form of optical and audio signals or alerts that can be used to assist the user when performing an operation such as when pouring/adding an ingredient into a container (for example, container 130) on the smart scale 104. Audio or visual prompts for the user can be activated from the client computing device 102 or the smart scale 104. For example, the system 100 can talk a user through the recipe 106. It can also provide incremental audio notices as a user adds ingredients. For example, if a recipe calls for six eggs the system 100 can audibly count as the user adds the eggs. The system 100 can count a measurement implement such as a tablespoon, cup, scoop, or similar, of an ingredient being added. The system 100 can also ask the user if the user wants to make adjustments on the fly, for example, the system may ask "would you like to add nuts to the cookies?" and then adjust the ingredient on the fly. The system can adjust one or more other ingredients, such as increasing nuts can correspond to decreasing another source of protein, without any further input from the user. Timers can also be set for actions requiring timing. These timers can be displayed on the client computing device 102 or the smart scale 104. An optional microphone on the smart scale 104 or the client computing device 102 can be used for voice prompts/commands. The smart scale 104 can also be configured to use one or more types of connectors such as an audio jack, Bluetooth, USB, or similar, and standard or custom communication protocols.

The client computing device 102 can be configured to allow a user to access and interact with any components of the system via, a smart app 202 (shown in FIG. 2) installed on a client computing device 102. The client computing device 102 can include the user interface 105, one or more processors, electronic storage, and other components. A client computing device 102 can include one or more of the following: a desktop computer, laptop computer, handheld computer, tablet computing platform, netbook, smartphone, and other computing platforms. The client computing device 102 can send commands to or receive requests or prompts from the smart scale 104.

The user interface 105 on the client computing device 102 and the smart scale display 132 can show various types of information in approximately real-time, such as, the current amount of ingredient being added, which ingredients have already been added including their individual amounts, nutritional values of one or more nutrients for the current amount of ingredient being added or already added, ingredients and their corresponding amounts still to be added, and other actions already completed and still to be performed. As used herein, "approximately real-time" is used to indicate processing as quickly as is practicable, and/or as can be achieved within the capability of human interaction or responses in the utilization of the methods and systems. The processing also is impacted by the latency inherent with communication protocols, hardware limitations, and software execution.

In one example, the system 100 includes at least one display integrated with the smart scale 104 and at least one other display that forms part of a client computing device 102. Both can be used for displaying various types of information that facilitate the preparation of a dish based on a recipe selected for or by the user. The smart scale display 132 can also show approximately real-time information that includes the connection status of the smart scale 104 with the client computing device 102.

The user interface 105 can also be configured to provide interface functionality to the user and at least one client computing device 102 through which the user can provide information to and receive information from the system. This enables data, user comments, feedbacks, alerts, results, queries, instructions, or similar, herein collectively referred to as "information," to be exchanged between the user and system. Examples of user interface 105 hardware and/or software components include a touch screen, keypad, touch sensitive and physical buttons, switches, keyboard, knobs, levers, display, speakers, microphone, indicator light, audible alarm, printer, and other interface devices. In some system implementations, the user interface 105 includes a plurality of separate interfaces. The user interface 105 can include at least one interface integrated with the client computing device 102. In further examples, a user interface 105 can refer to software, hardware, a combination of hardware and software, or a device the primary function of which is to allow communications or interactions between two or more devices or between a user or plurality of users and one or more devices. A user interface 105 can be configured such that a user can navigate through electronic folders, databases, servers, networks, and various local or external storage media to locate, view, select, or store the desired recipe.

Figure 2:
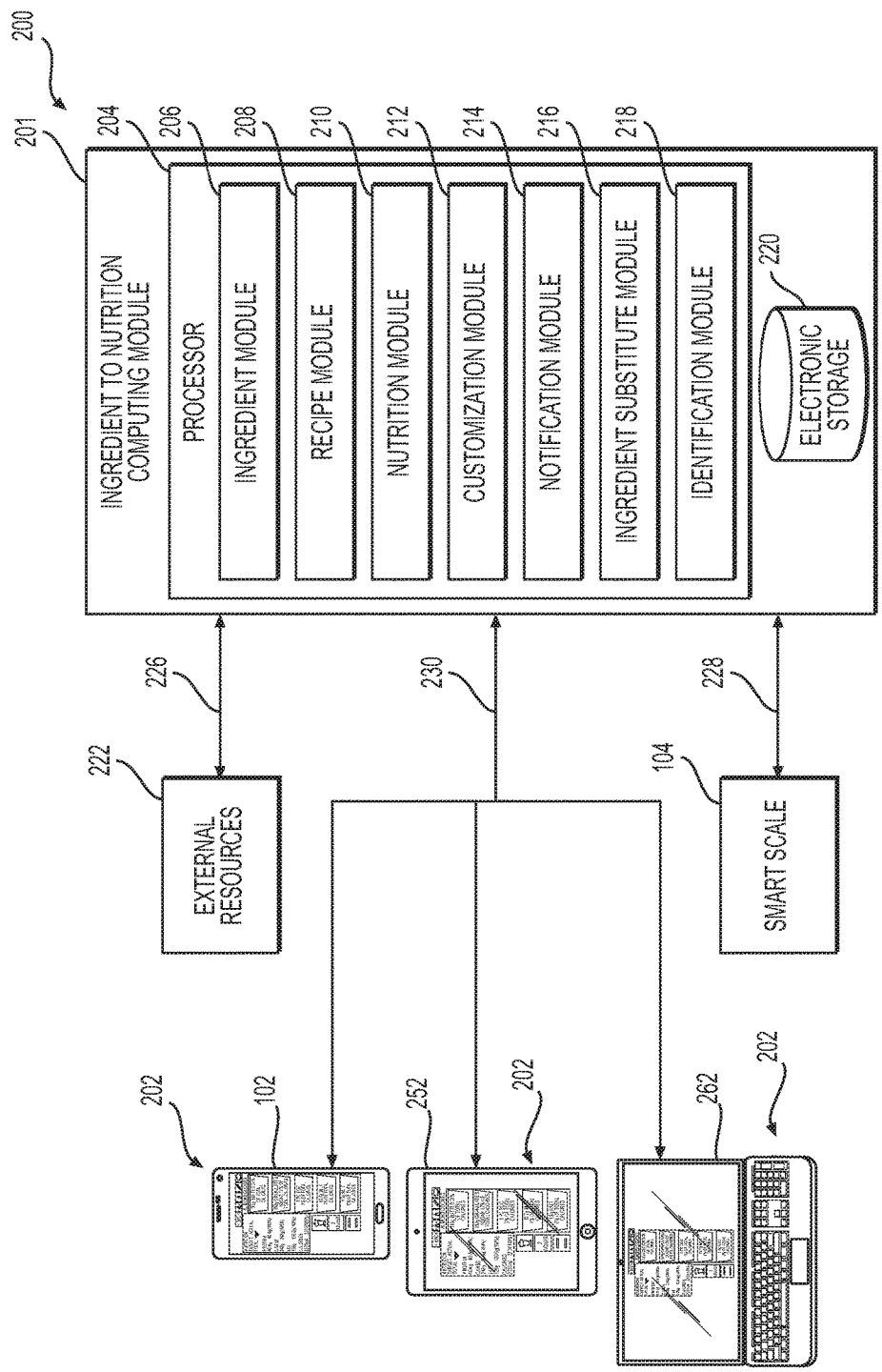
FIG. 2 is a schematic diagram of an illustrative computing environment showing components that communicate to enable various operations involving a smart scale.

The system 200 shown in FIG. 2 to support the computing environment of FIG. 1 is now described. FIG. 2 is a schematic diagram of an illustrative computing environment 200 showing components that communicate to enable various operations involving a smart scale, such as the scale 104, a computing module 201, and one or more client computing devices, such as the client computing device 102 shown in FIG. 1. The computing module 201, titled "Ingredient to Nutrition Computing Module," can be implemented in a smart app 202, installed on one or more client computing devices 102, 252, and 262 or similar. The computing module 201 can include at least a processor 204, the ingredient module 206 for processing directed to one or more ingredients of the recipe 106, the recipe module 208 for processing directed to the recipe 106, and the nutrition module 210 for processing directed to the nutritional panel 110 and the adjust button 126. The computing module can further include the customization module 212 for processing custom changes to the system 100 such as displays. The customization module 201 can provide an automated preselected substitution filter; the preselected substitution filter may be applied to the recipe to automatically identify ingredients for substitution and replace such ingredients with substitutions in the recipe. The computing module 201 can further include the notification module 214 for processing notifications to the user of the system 100 during operation of the system 100, the ingredient substitution model 216 for processing the substitution of ingredients in the recipe 106 and the identification module 218 for processing identifying new data for the system 100 such as new recipes, new substitute ingredients or similar, and an electronic storage 220. The client computing device 102 can engage in a two-way or one-way communications with the smart scale 104 (using communication connection 226), one or more external resources (using communication connection 228), and the smart app 202 in one or more devices 102, 252, and 262 (using communication connections 230). The communication connections 226, 228 and 230 can be wired or wireless and may be one-way or two-way. In another example, a smart scale 104 using a two-way link (not shown) with devices 102 provides even more functionality. The computing module 201 can include one or more algorithms, software, a component of a software, or a database that performs, or is involved in the performance of, one or more operations including calculating values, retrieving data, storing data, editing a file, deleting files, transmitting data or instructions, receiving data or instructions, displaying various types of information or data, processing data, allowing communication between two or more devices, servers, or networks.

The smart app 202 can be configured to transmit or receive approximately real-time information to or from the smart scale 104. The smart app 202 can be installed on at least one of a variety of client computing device 102. Examples of such devices are shown in FIG. 2 and include devices 102 (a mobile phone), 252 (a tablet) or 262 (a laptop), or similar. In yet further examples, the smart app 202 can be installed on the scale 104 or on a separate hardware and/or software platform. In a yet further example, portions of the smart app 202 processing can occur in multiple components. The smart app 202 can access information relating to recipes, ingredients, target amounts, and corresponding nutritional data for a given amount of an ingredient in a recipe. The smart app 202 can further access information relating to substitutions, actions, notifications, and schedules. The smart app 202 can access information from local, and external and/or online databases. The smart app 202 can also present a user with user interface 105 that provides menus and menu options. The user interface 105 can also provide means for entering, searching, storing, and identifying user inputs, information, and data. Such user inputs, information and data can include actions to be performed; amounts of ingredients to be added; adjustments to ingredients; substitute ingredients; corresponding nutrition data for a given ingredient quantity, a combination of ingredients and/or the total nutrition for the complete recipe; recipes with similar total nutritional values; links; and similar data. The smart app 202 can be configured to receive commands or instructions via various methods for user inputs such as using a touchscreen display, keypad, keyboard, or voice-commands, visual commands, and similar. For example, the smart scale 104 can have a button pad that allows transmission of instructions or commands to the smart app 202, or vice versa.

The smart app 202 can be further configured to assist the user in adjusting individual ingredients or combinations of ingredient(s) of recipes. The smart app 202 can support data generation about a user's adjustment of the amount of an ingredient based on data detected at the scale 140. When an amount added to an individual ingredient or a combinations of ingredient(s) of a recipe is changed, the smart app 202 can automatically recalculate and display the new nutritional information associated with the adjusted amount of the ingredient(s) and the impact on the change of the ingredient(s)' nutritional information on the nutritional information for the complete recipe. The smart app 202 can detect if a user adds too much or too little of one ingredient and can promptly notify the user for confirmation and/or provide the nutritional data for the ingredient and the complete recipe based on the changes to the ingredient. Where the scale 104 detects a difference between the targeted and actual ingredient amounts, the notification may assist the user to detect an intentional ingredient adjustment versus an error. For example, if a user decides, in the middle of an ingredient addition, to use an ingredient amount less or greater than that required by the recipe target amount, the smart app 202 can detect if the user has stopped adding the ingredient before reaching the target amount or continued adding beyond the target amount. In either case, the smart app 202 can confirm whether or not there is an intentional adjustment and if unintentional, allow the user to correct the mistake. Multiple methods may be employed for assessing whether the actual amount is different from the target amount. An exemplary method is setting the new actual amount upon a predefined time interval of user inactivity. A further exemplary method is to request a status of the ingredient amount added to the scale 104, such as, provide a user display notification of a difference between the targeted amount of the ingredient and the actual amount and request acceptance of the new amount. A further exemplary method in the case where the amount is less than the target amount is to provide more time to complete the addition of the ingredient, and request a confirmation from the user when the actual amount of the ingredient is completed. In one example (not shown), after a notification such as, "the amount added of the current ingredient is different than the target amount," a user can be prompted to select "yes" or "no" via the user interface 105 in response to a smart app 202 query such as "Do you want to proceed with an adjustment to the current ingredient?" If the user agrees with the current amount as a basis to adjust the current ingredient, the system 100 can update the real time storage of the nutritional information to reflect that the actual amount is determined and to provide the calculations for the "Actual" column 115 on the nutritional panel 110. Otherwise, the smart app 202 can present a screen to the user that shows one or more user options if the user does not wish to proceed with the current actual ingredient amount. For example, the user may decide to manually modify other ingredients or ingredient amounts, thereby adjusting those ingredients.

In one system 100 implementation, the ingredient to nutrition computing module 201 and external resources 222 can be configured such that receiving entry or selection of an ingredient can include reading, scanning, and optically recognizing information that identifies an individual ingredient. For example, external resources (not shown individually) and a client computing device 102 can include a scanner controlled via a user interface 105 configured to recognize a standard barcode, QR code, RFID tag, or other identifying information included on the packaging of an ingredient. An external resource, the client computing device 102, or the smart scale 104 can include optical recognition sensors controlled via the user interface 105 that is configured to optically recognize individual ingredients. Scanning ingredient identification data provides a convenient way for the system to determine which recipe ingredient is next to be added into the container 130 on the smart scale 104.

Figure 3A:
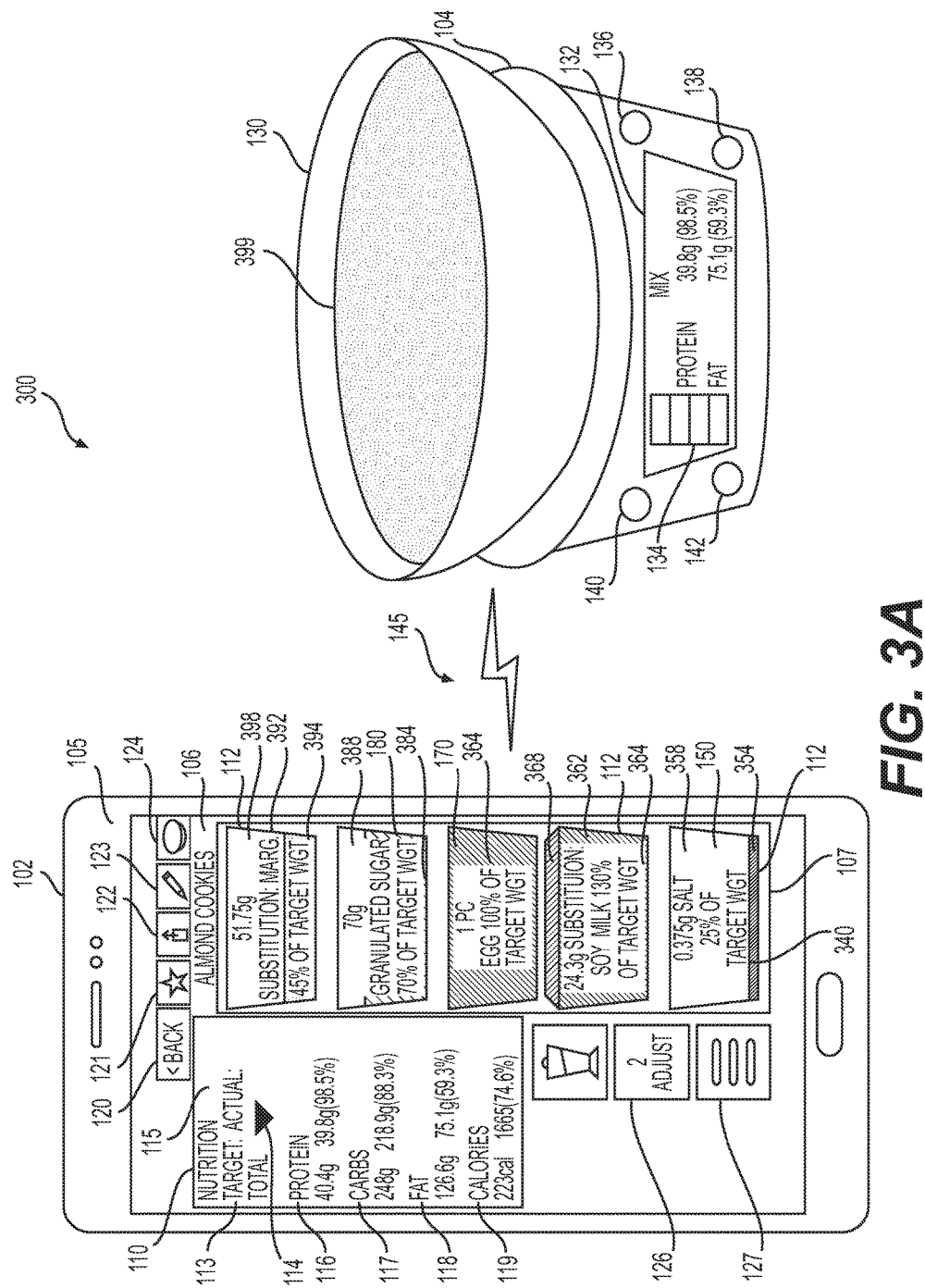
FIGS. 3A-3B are an illustrative example of the FIG. 1 recipe upon completion of adding the ingredients.
Figure 3B:
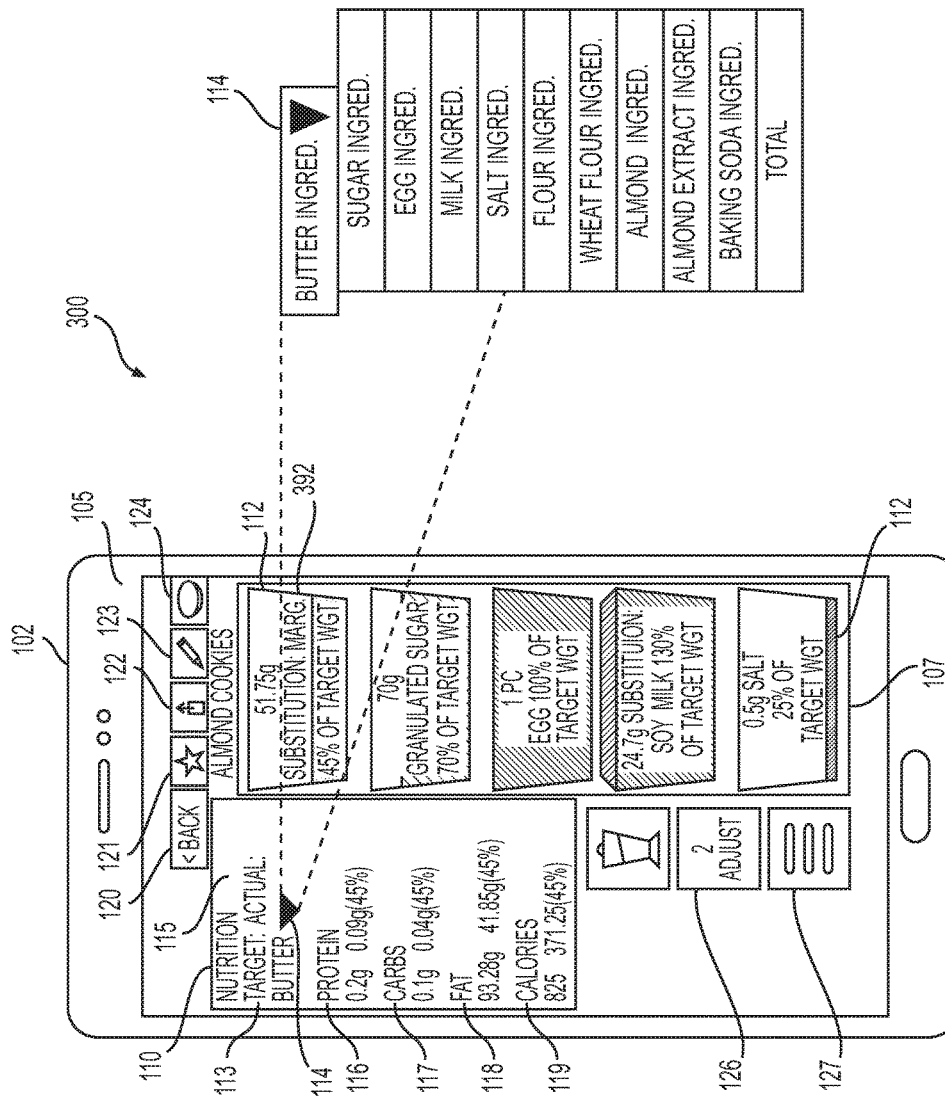

FIGS. 3A-3B are an illustrative example of the FIG. 1 recipe 106 upon completion of adding the ingredients shown in the recipe column 107, with adjustments to multiple ingredients in the recipe column 107. In the FIG. 1 example, the final ingredient is shown in the top recipe ingredient block 112 based on a portion of the recipe 106 ingredients, 150, 160, 170, 180 and 190, being displayed with the butter ingredient 105 being the final recipe ingredient block 112. Ingredient adjustments can include a number of different types of adjustments. One example is a substitution that can be implemented automatically for all recipes (for example, based on a program applied against recipes entered or selected). Alternatively or additionally, a substitution can be performed on an individual-by-individual ingredient basis. A substitution also can be performed based on a manual substitution where the user selects the ingredient to be substituted at the outset of the recipe or at any time prior to starting to add the ingredient to the scale 104 as the recipe 106 is executed. In other examples, these types of ingredient adjustments can be combined and multiple types of ingredient adjustments can be applied to individual ingredients or a combination of ingredients. One example is where an ingredient substitution is followed by an adjustment to the amount of the ingredient through preselecting an adjusted amount or adding less or more than the targeted amount of the ingredient as predetermined in the recipe 106. In addition, there can be numerous visual indications in the recipe ingredient block 112 of adjustments to ingredients including highlighting each recipe ingredient block 112 as the relevant ingredient for the recipe ingredient block 112 is identified for operations using the system 100. Such highlighting can include textual, visual, audio, video or other notification of operations being performed regarding that recipe ingredient block 112. Several highlighting, notification, display or other data output (hereinafter, referred to as highlighting) methodologies are employed in the example of FIGS. 3A-3B to identify each individual ingredient and any ingredient adjustment(s) being performed on that ingredient, including adjustment(s) based on an automated approach or performed manually by the user of the system 100. In addition to the highlighting methodologies being implemented to provide notification of ingredient adjustments, they also can be used to present the approximately real time data associated with the scale 104 weighing ingredients as they are added to the container 130 to be measured by the scale. In this manner, the same methodology can provide two different indications during the ingredient adding operation and upon completion of the adding operation. More particularly, the highlighting which shows an ingredient being measured as it is added, such as fill line 340 in FIG. 3A in the recipe ingredient block 112 can both first show that the ingredient is being added and give the user guidance in the amount of the ingredient needed to complete the target amount as the fill line 340 approaches the top of the recipe ingredient block 112. The same fill line 340 also can indicate the final amount of the ingredient weighed by the scale 104. Where the fill line is less than the target amount or more than the target amount of the ingredient, the actual amount of the ingredient is different than the target amount. Therefore, in some examples, the highlighting methodologies can serve multiple purposes. In addition, the same ingredient can be the subject of multiple ingredient adjustments, such as, for example, an adjustment of replacing the ingredient as predetermined in the recipe 106 with a substitute ingredient. Then, that same substitute ingredient can then be further adjusted by changing the amount of the ingredient compared to the target amount, so that the actual amount is greater than or less than the target amount. As a result, the options for ingredient adjustments can be mixed and matched for one or multiple ingredients in a recipe 106, and can be based on automated adjustments and/or manual adjustments.

The example of the recipe 106 in FIGS. 3A-3B is now described. FIG. 3A depicts the completion of recipe 106, such that each of the ingredients shown on the ingredient display 107 has been added and the weight and associated data is processed so that the nutritional panel 110 is populated. As is described further below, a number of the ingredients have been adjusted to a smaller amount than the target amount. As a result, in the nutritional panel 110, which displays nutritional information for the total or the complete recipe, the values in weight (as well as the percentage) for the actual nutrition 115 is lower than the target nutrition 113. This is shown in the nutritional panel 110 with adjustments to protein 116, carbs, 117, fat 118 and calories 119, each with a reduction due to the ingredient adjustments, including 98.5% for protein 116, 88.3% for carbs 117, 59.3% for fat 118 and 74.6% for calories 119. For example, this contrasts with the nutritional panel 110 in FIG. 1 where the actual nutrition 115 is the same as target nutrition 113 and the percentage is 100% as there are no ingredient adjustments for the recipe 106 executed in FIG. 1. FIG. 3A also shows the scale 104 and its network 145 as a communication channel between the client computing device 102 and the scale 104.

The ingredient display 107 is now described with regard to the ingredient adjustments and the data displayed regarding the change in the nutritional information for each ingredient, on the basis of FIG. 3A representing the completion of execution of the recipe 106. In this example, ingredients can appear from bottom to top in the ingredient display 107; further ingredients can be viewed for example by scrolling the ingredient display 107. The first ingredient adjustment shown in FIG. 3A represents the first ingredient listed (the salt ingredient 150). The recipe ingredient block 112 for the salt ingredient 150 displays the fill line 340 and a highlighted portion 354 below the fill line 340. The highlighted portion 354 can show visually the amount of the measurement represented by the recipe ingredient block 112 that is occupied, as an indication of the amount of the salt ingredient 150 that can be measured by the scale 104. Additional data presented within the recipe ingredient block 112 for the salt ingredient 150 is the remaining portion 358 of the recipe ingredient block 112 for the salt ingredient 150 that is not occupied, which can show another perspective on the actual amount 115 of the salt ingredient 150 being less than the target amount. The recipe ingredient block 112 for each ingredient can also present data about the ingredient, such as, as shown in FIG. 3A, the final weight of the salt ingredient 150, or 0.375 g, and the percentage of target weight (shown as "Target Wgt.").

The second ingredient shown in FIG. 3A corresponds to the FIG. 1 milk ingredient 160, but with a substitution of a soy milk ingredient 362 for milk. In alternative examples of the system 100 and the approach to presenting the nutritional information for adjustments to ingredients, the target amount 113 can represent the original ingredient or the milk ingredient 160 and the substitute ingredient or the soy milk ingredient 362 can be compared to the original ingredient as the target, or in other examples, the target amount 113 can be adjusted according to a design decision about adjusting the weight of the substitute ingredient according to one or more criteria, such as to maintain one or more nutritional measures from the recipe 106 or a recipe 106 proportion such as the amount of liquid versus solids in the recipe 106. In continuing with this example of FIGS. 3A and 3B, the target amount 113 can be based on the original ingredient or the milk ingredient 160. The soy milk ingredient 362 also is an example of multiple ingredient adjustments, as in addition to the scale 104 weighing the soy milk ingredient 362 to reach the target amount 113, the amount of soy milk ingredient 362 is increased beyond the target amount 113, as shown by the highlighted portion 364 within the recipe ingredient block 112 and the additional highlighted portion 368 above the recipe ingredient block 112 for the soy milk ingredient 362. As a result, the actual amount 115 of the soy milk ingredient 362 compared to the target amount 113 is 130% of the target amount 113, with a total weight of 24.3 g.

The third ingredient shown in FIG. 3A is the same as the FIG. 1 egg ingredient 170, and as the highlighted portion 364 represents, the actual amount 115 is the same as the target amount 113 for a unit measurement of the egg ingredient 170. In one example of the system 100, standard weight and nutritional information for unit measurements can be applied and the target amount 113 and actual amount 115 equated, or in other examples, the target amount 113 can be the standard weight, but the actual amount 115 can be based on the measured weight of the actual egg ingredient 170 on the scale 104.

The fourth ingredient shown in FIG. 3A is similar to the salt ingredient 150 and the egg ingredient 170 in that there is no ingredient substitution adjustment for the sugar ingredient 180. This ingredient also is similar to the salt ingredient 150 in that the highlighted portion 394 can show that only a portion of the target amount 113 for the sugar ingredient 180 is added during the recipe 106 execution, and the data of 70 g and "70% of Target Wgt" presents the numerical data as well to show the shortfall.

Finally, the fifth ingredient shown in FIG. 3A also is a substitute margarine ingredient 392 that can replace the butter ingredient 190. The recipe ingredient block 112 for the margarine ingredient 392 is partially highlighted with portion 394 representing the amount of the margarine ingredient 392 measured by the scale 104 and the portion 398 presenting the unoccupied portion of the recipe ingredient block 112 or the difference between the target amount 113 and the actual amount 115. The margarine ingredient 392 also is an example of multiple ingredient adjustments. In addition to the margarine ingredient 392 being an adjustment to the butter ingredient 190, the actual amount 115 of the margarine ingredient 392 is less than the target amount 113. As a result, the actual amount 115 of the margarine ingredient 392 compared to the target amount 113 is 45% of the target amount 113, with a total weight of 51.75 g. The reduced quantities of some of the "Almond Cookie" recipe 106 ingredients also are depicted in this FIG. 3A with the contents 399 of the container 130 shown as reduced compared to the corresponding contents of FIG. 1.

FIG. 3B is a schematic diagram of an illustrative computing environment usable to provide a display option for the nutritional panel 110. The nutritional panel 110 can include a data entry field 114 for input (for example by activation of an icon such as a dropdown arrow) to select the data presented in the nutritional panel 110 to be either the total recipe 106 (as shown in FIG. 3A) or for any one of the individual ingredients in the recipe 106. In this example, the data entry field 114 icon can be activated in order to expand the listing to multiple listing selections, such as for this recipe 106, butter, sugar, egg, milk, salt, flour, wheat flour, almond, almond extract, baking soda or the "total" to designate the nutrition for the complete recipe 106. Where a different item on the list for the field 114 is activated, the nutritional panel 110 data can be presented for that listing. In this example, the butter listing is selected and the nutritional panel 110 has updated to provide the nutritional data related to the butter ingredient 190, which has in this example, been replaced with the substitute margarine ingredient 392. This is shown in the nutritional panel 110 with the following changes to protein 116 of 0.09 g, carbs 117 of 0.04 g, fat 118 of 41.85 g and calories 119 of 371.25, each with a reduction of 45% of the target amount 113 due to the ingredient adjustments, including 98.5% for protein 116, 88.3% for carbs 117, 59.3% for fat 118 and 74.6% for calories 119. In additional examples, the nutritional panel 110 can prompt a listing to appear that corresponds to the ingredient currently identified as the active ingredient for an adding operation in executing the recipe 106.

Figure 4:
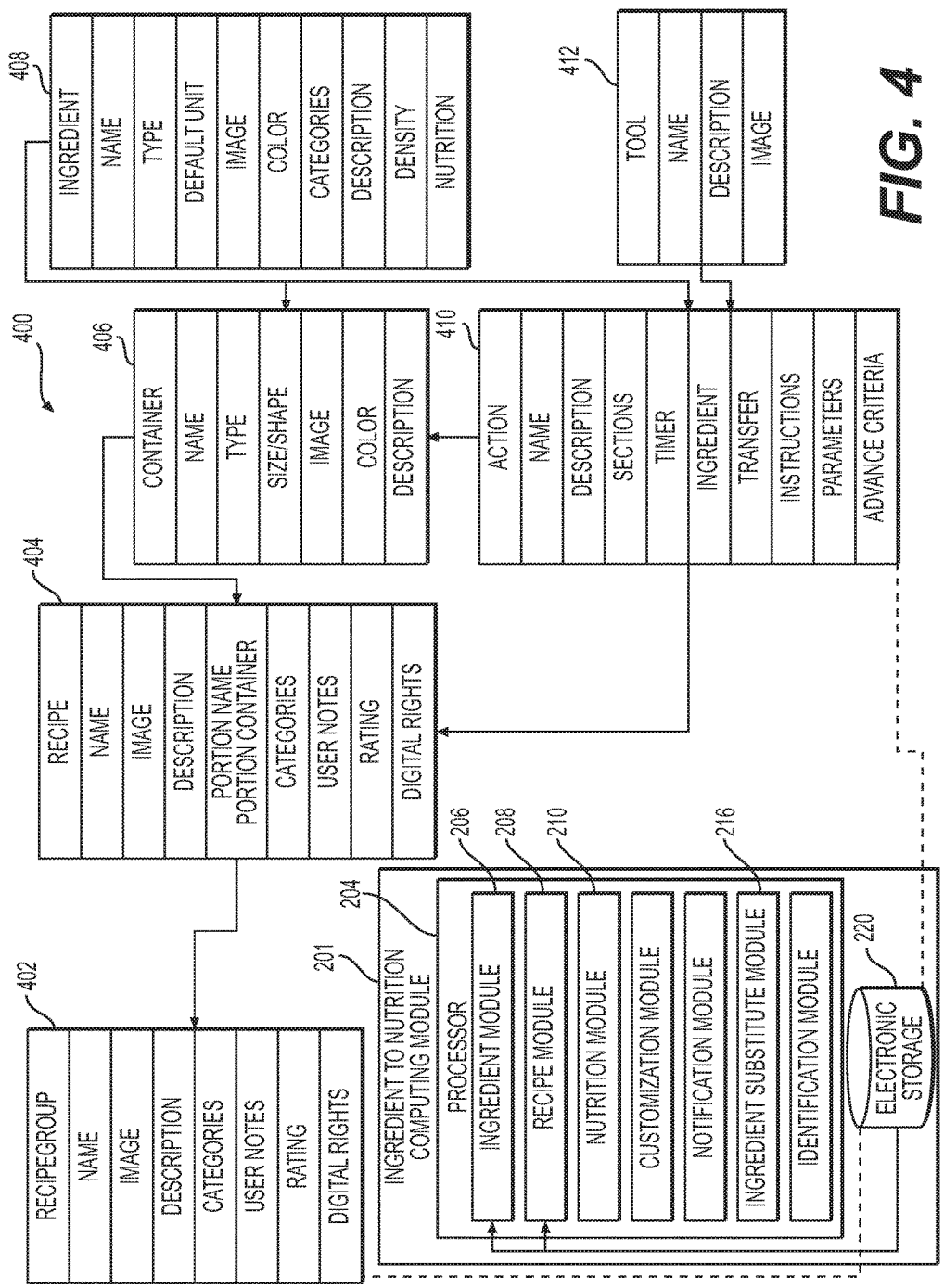
FIG. 4 is an illustrative data structure showing the data flow among various data sets associated with the execution of a recipe.

FIG. 4 is an illustrative data structure 400 showing the data flow among various data sets associated with the execution of a recipe 404, including various data sets as follows: the recipe 404 and container data 406, ingredient data 408 and action data 410, which encompass the comprehensive execution of a recipe. Each of the data sets, 404, 406, 408 and 410 also include specific data (for example, number of calories for a given protein shake serving) or information (for example, name of a recipe or unit of weight to be used) that can be transmitted to or shared with other data sets to allow the processing of various data, and information to generate output information for the user who executes the recipe. Examples of output information are: a message, alert, update, or the result of a calculation. More particularly, the output information can result from the calculation of adjusted ingredient amounts and the impact on the nutritional information of the target versus the actual ingredient amount. Additionally, the output information can result from an event trigger that necessitates the issuance of an alert to a user. An example of this trigger is when a recipe target amount for an ingredient is different than the actual amount. Examples of differences are as follows: the actual amount of the ingredient is less than the targeted amount or greater than the targeted amount. The system can determine that the actual amount of the ingredient is less than the target amount of the ingredient when, for example, a timed delay while the scale anticipates the addition of more of the ingredient elapses. The system can then present to the user a request for a confirmation that the current amount is complete or default to accept the current amount.

The processing of a specific combination of data and information can be triggered as a result of a user command, user input, recipe-prescribed user action, or user selection from a smart app 202 menu or menu options via a user interface 105, or by one or more signals detected by one or more system sensors. The data structure 400 includes the following data sets: recipe group 402, recipe 404, container 406, ingredient 408, action 410, and tool 412. The data sets 402, 404, 406, 408, 410, and 412 show various data and information such as names, images, descriptions, categories, user notes, ratings, digital rights, portion names, portion containers, types, size or shape, color, default unit, density, nutrition, sections, timer, transfer, instructions and parameters. The data sets can be stored in the same or different electronic storage media.

Figure 5A:
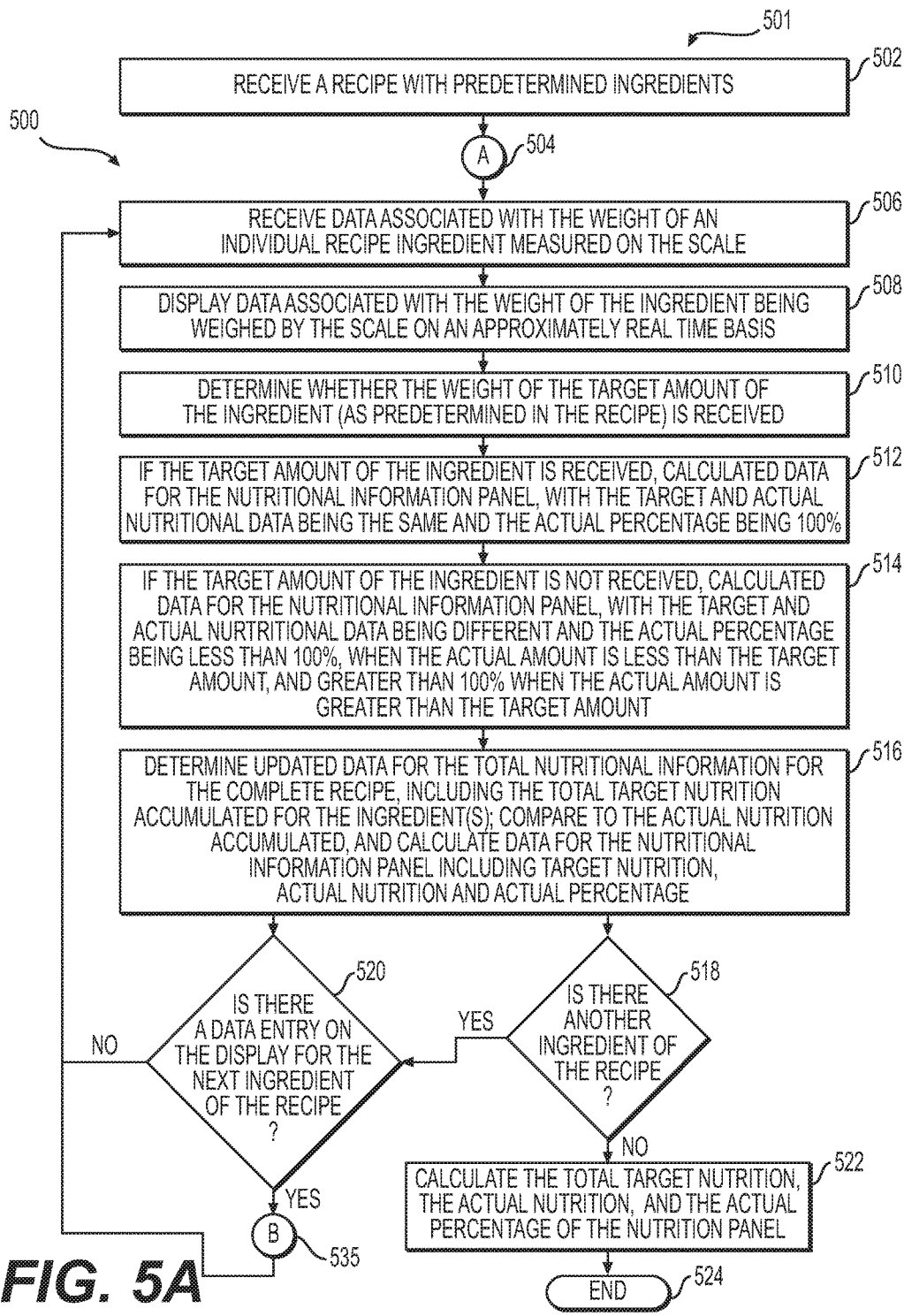
FIGS. 5A-C are flow diagrams showing processes for implementing the system.
Figure 5B:
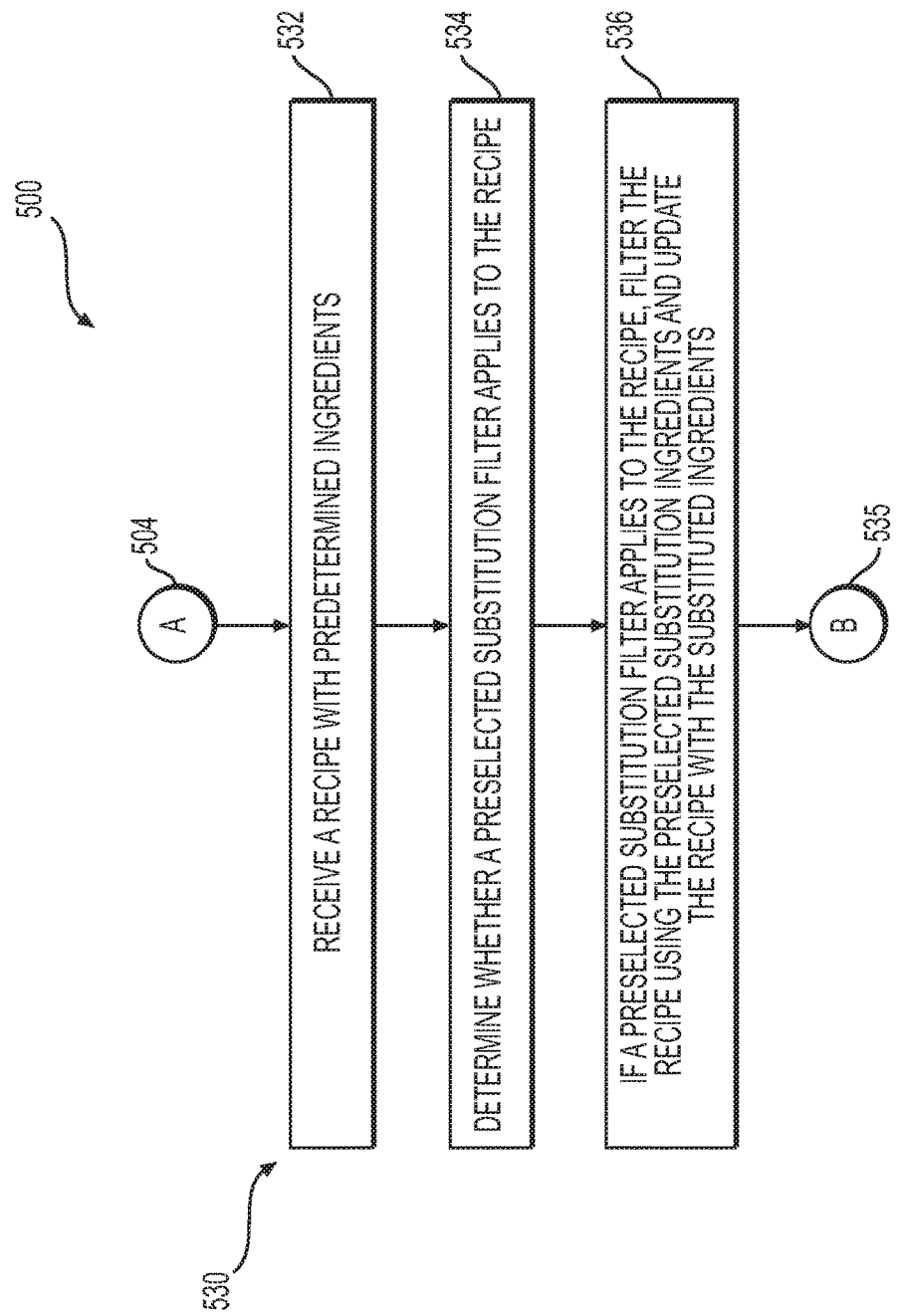
Figure 5C:
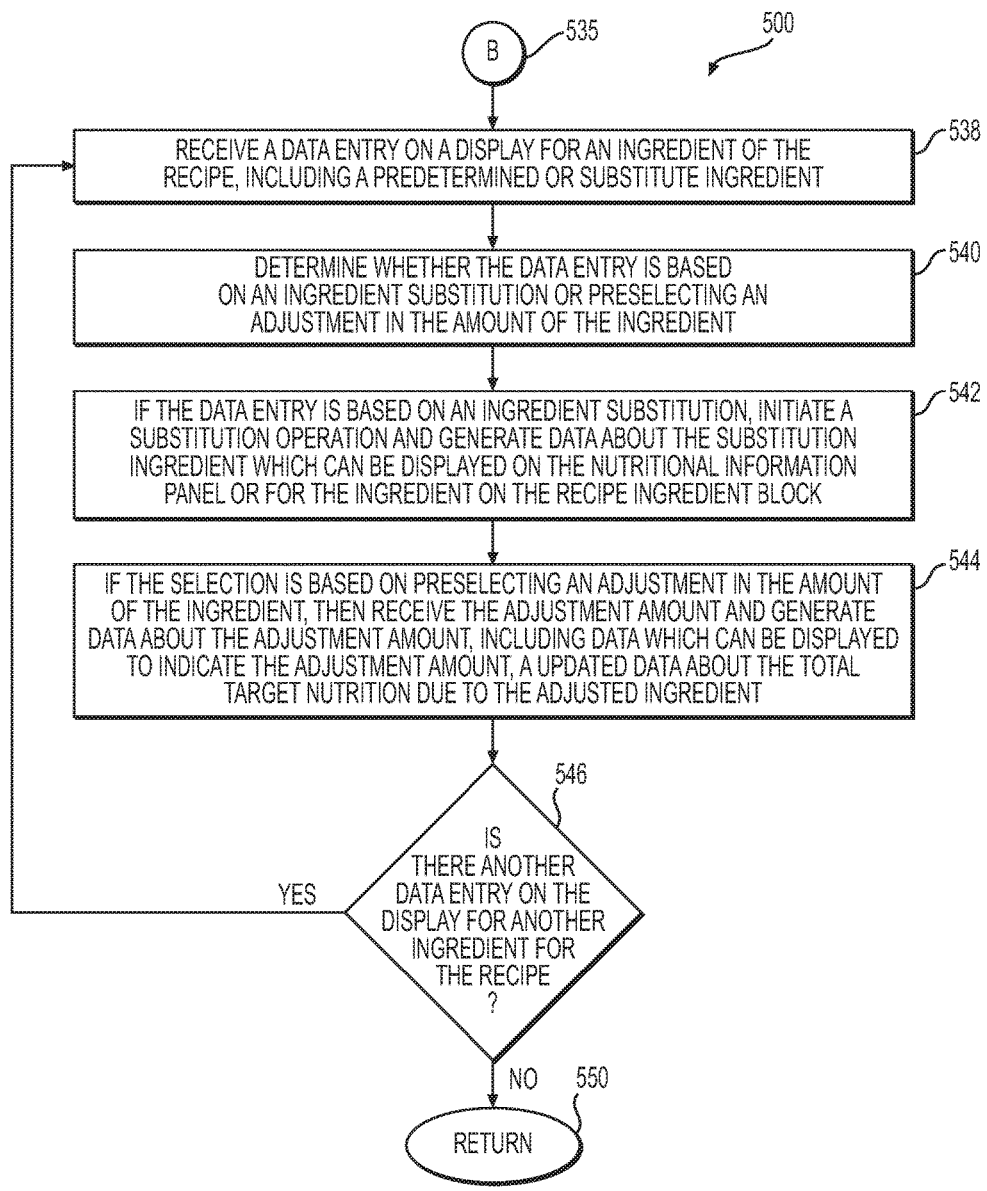

FIGS. 5A-C are flow diagrams showing processes for implementing the system 100. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like, that perform functions or implement particular abstract data types. The order in which the operations are described is not intended to be construed as a limitation to embodiments of the invention. A client device, a remote content-item service, or both, may implement the described processes. Whereas, diamonds represent an operation whereby the user selects a binary yes or no response based on information presented on an informational display. Circles denote a sub process.

FIG. 5A is a flow diagram showing a process 501 for detecting ingredient adjustments and generating data for display on the nutritional panel 110 about the ingredient adjustments. The process 501 is illustrated as a collection of blocks in a logical-flow graph, which represents a sequence of operations that may be implemented in hardware, software, or a combination thereof. The blocks are referenced by numbers 502-516 and 522. Each of the operations 518 and 522 represents the processing of a query with two paths for subsequent processing including an affirmative answer to the query and alternatively a negative answer to the query.

In operation 502, recipe information is received that indicates predetermined ingredients. Data collected in operation 502 is processed through Sub process A 504 for use in operations 506-522. At operation 506 data associated with the weight of an individual recipe ingredient measured on the scale is received from sub process 504. Recipe information received in operation 502 is then combined with ingredient weight data collected by the scale at operation 506. These data are then displayed on the information panel by operation 508 on an approximately real-time basis. Data received in operation 506 and 502, are then processed at operation 510 whereby the system determines whether the weight of the target amount of the ingredient (as predetermined in the recipe) is received. If the target amount of the ingredient is received at operation 512 data for use on the nutritional information panel is calculated, with the target and actual nutritional data being the same and the actual percentage being 100%. If the target amount of the ingredient is not received, at operation 514 data is calculated for the nutritional information panel, with the target and actual nutritional data being different and the actual percentage being less than 100%, when the actual amount is less than the target amount, and greater than 100% when the actual amount is greater than the target amount. At operation 516, once the updated data for the total nutritional information for the complete recipe, including the total target nutrition accumulated for the ingredient(s) is determined it is compared to the actual nutrition accumulated and then calculated. The resulting calculations of target nutrition, actual nutrition and actual percentage are displayed on nutritional information panel At operation 518 the user is prompted if there is another ingredient of the recipe. If the user responds affirmatively operation 520 is invoked whereby the user is asked if there is a data entry on the display for the next ingredient of the recipe. If the user responds affirmatively, sub process B 535 is invoked which returns the process to operation 506 whereby operations 506-516 will be repeated with input from sub process A 504. However, at operation 518 if the user responds in the negative when prompted if there is another ingredient of the recipe, this input prompts operation 522 that calculates the total target nutrition, the actual nutrition, and the actual percentage for the nutrition panel. Operation 524 ends the process FIG. 5B is a flow diagram showing a process 530 for detecting ingredient adjustments and generating data for display on the nutritional panel 110 about the ingredient adjustments. The process 530 is illustrated as a collection of blocks in a logical-flow graph, which represents a sequence of operations that may be implemented in hardware, software, or a combination thereof. The blocks are referenced by numbers 532-536. Sub processes A 504 and B 535 are denoted by circles.

At sub process A 504, user inputted recipe data with predetermined ingredients is received at operation 532. The system then determines whether there is an automated basis to determine substitutions for the recipe at operation 534. One example of an automated basis is a preselected substitution filter. The preselected substitution filter can be applied to the recipe to automatically identify ingredients for substitution and replace such ingredients with substitutions in the recipe. If a preselected substitution filter applies to the recipe, the recipe data is filtered using the preselected substitution ingredients and then the recipe data is updated with the substituted ingredients at operation 536. The updated recipe data from operation 536 is then sent to sub process B 535.

FIG. 5C is a flow diagram showing a process for detecting ingredient adjustments and generating data for display on the nutritional panel 110 about the ingredient adjustments. The process is illustrated as a collection of blocks in a logical-flow graph, which represents a sequence of operations that may be implemented in hardware, software, or a combination thereof. The blocks are referenced by numbers 538-544. A circular shape depicts sub process B 535.

At operation 538 the system receives a data entry from a user for an ingredient of the recipe, including an original or a substitute ingredient that is displayed on a screen from sub process B 535. The system then determines whether the data entry is based on an ingredient substitution or preselecting an adjustment in the amount of the ingredient at operation 540. At operation 542 if the receives an input that the data entry is based on an ingredient substitution, the system will initiate a substitution operation and generate data about the substitute ingredient which can be displayed on the nutritional information panel or for the ingredient on the recipe ingredient block. At operation 544 if the selection is based on preselecting an adjustment in the amount of the ingredient, then receive the adjustment amount and generate data about the adjustment amount, including data which can be displayed to indicate the adjustment amount and updated data about the total target nutrition due to the adjusted ingredient. At operation 546 the user is then prompted to input if there is another data entry on the display for a different ingredient for the recipe. A negative response returns the user to operation 550, while an affirmative response returns the user to operations 538-544.

FIG. 6 is an exemplary nutrition information table 600 for an almond cookie recipe 106, with a reference to the location of the table 600 in the electronic storage of the ingredient to nutrition computing module 201 and its interaction with the ingredient, recipe and nutrition modules 206, 208 and 210, respectively. The table shows nutritional data for the ingredients of the recipe 106, as well as the Total. Some of the nutritional data is shown in grams, including grams of protein, carbohydrates, and fat. Calories are shown as the number of calories. The first column 602 of the table, labeled "Almond Cookies Recipe: Ingredients," lists the names of the recipe ingredients, while the second column 604 shows the ingredient weights and corresponding percentages. The remaining columns show the nutrition values (in grams and percentage) of the following nutrients: protein 606, carbohydrates 608, total fat 610, as well as the number and percentage of calories 612 for each ingredient weight. The nutrient percentages are calculated by dividing the nutritional weight from of an ingredient by the total weight of the nutritional component shown on the last row of a nutrient column. For example, the percentage of protein from butter in the recipe is calculated by dividing 0.98 g by the total protein content of the entire recipe (40.42 g). Row 614 shows that 115 grams of butter (22% of the total weight) contains 0.98 g (2%) of protein, 0.1 g (2%) of carbohydrates, 93.28 g (74%) of fat, and 825 calories (37%).

One basis for ingredient adjustment is where one or more ingredients are replaced by substitute(s) ingredients. The system 100 can provide substitutes associated with recipes 106 or it can support searches for acceptable substitute ingredients via the smart app 202, the computing module 201 or any communication with other resources that can provide substitution data.

In one example of ingredient substitution, the amount of the substitution can be preselected by activating the adjust button 126, and employing a variety of options to change the amount of the substitution, including selecting new amounts, entering new amounts or presetting a default approach for changing amounts (not shown). In the example shown in FIG. 6, the following approach is implementing: the ingredient adjustment user interface 105 supports user input to toggle to an alternative panel in which there are ingredient substitution options. The options can include selecting the substitution ingredient and then using the ingredient adjustment user interface 105 to preselect the amount of the substitution ingredient based on the options provided to the user of adjustments as a function of the weight of the ingredient, the percentage of the current serving size of the ingredient, or any nutritional measurement of the ingredient. After the user inputs the desired ingredient adjustment, the smart app 202 can then update the user interface 105 with the substitute ingredient (optionally labeling the ingredient block as "Substitution: [substitute ingredient]," as shown in FIG. 3A as substitution soy milk 362 and substitution margarine 392. The smart app 202 can further update the user interface 105 with the weight or nutritional data included in the ingredient block, which is accurate for the substitute ingredient. The smart app 202 can still further update the nutritional panel 110 with the new substitute ingredient in the actual nutrition column 112. Making the recipe can then proceed as to this substitute ingredient in the same manner as general execution for each of the ingredients in the recipe.

In another example of ingredient substitution, the smart app 202 can search for suitable substitute ingredients by scanning the paired client computing device 102's internal storage for any stored relevant information, or the smart app 202 can search one or more databases in local networks or third-party online databases that are available for free or via a subscription. The system 100 can also provide access to at least some system databases with complete or limited access to information such as regularly updated or added custom recipes and nutrition data for uncommon ingredients, including access to regular firmware, app, and other software updates. The system can also provide full access to all system databases, for example, as part of a yearly subscription plan.

In yet another example of ingredient substitution, the smart app 202 can access a database of dietary preferences, and the ingredients of a recipe can be filtered to determine whether any of the ingredients are either preferred or excluded from the dietary preferences data. Where a match is found, the identified common ingredient either can be adjusted or eliminated from the recipe and where available in the dietary preferences database, a substitute ingredient can replace the identified ingredient in the database.

Figure 7:
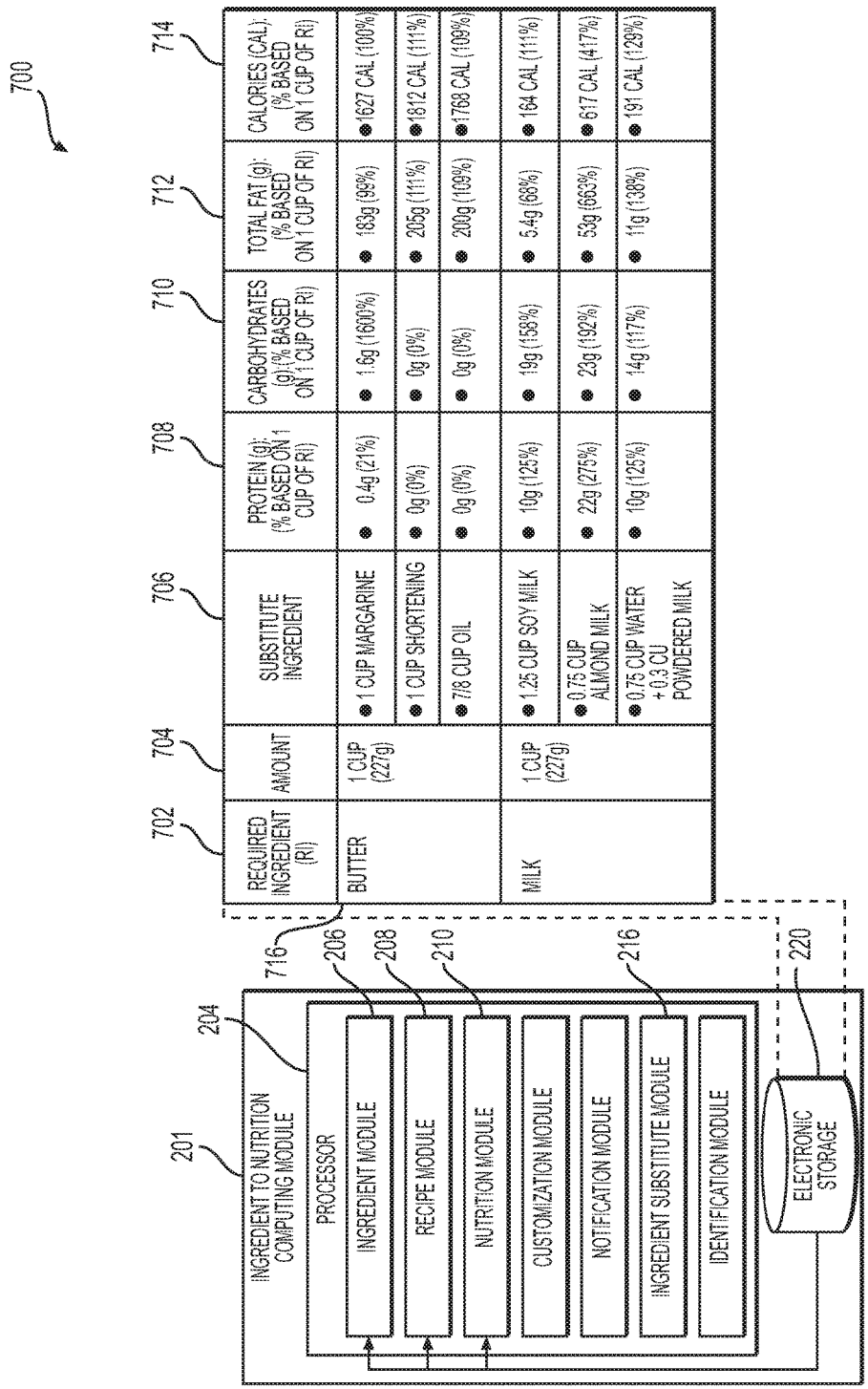
FIG. 7 shows one example of substitution data in the form of an ingredient substitution table.

FIG. 7 shows one example of substitution data in the form of an ingredient substitution table 700 containing a list of ingredients that can be used as substitutes for butter (margarine, shortening, or vegetable oil) and for milk (soy milk, almond, or a mixture of water and powdered milk). FIG. 7 also shows a reference to the location of the table 700 in the electronic storage of the ingredient to nutrition computing module 201 and its interaction with the ingredient, recipe and ingredient substitution modules 206, 208 and 218, respectively. The first and second columns show the name of each ingredient 702 and a sample amount 704 required in a recipe. The third column 706 provides a list of multiple substitute ingredients for each of butter and milk. For example, if a recipe calls for 1 cup of butter 708, a possible butter substitute is 1 cup of margarine or ⅞ cup vegetable oil, both being quite common in most households. The remaining columns 4-6 list the weights in grams and percentages of protein 708, carbohydrates 710, and total fat 712. To calculate, for example, the percentage of protein from 1.25 cup of soy milk when used as a substitute for 1 cup of milk, the weight of protein in grams from 1.25 cup of soymilk is divided by the weight of protein in grams from 1 cup of milk and then multiplied by 100.

FIGS. 8A-8B depict two alternative tables constructed for the almond cookie recipe 106 that show in FIG. 8A the recipe original ingredients, amounts and nutritional information for each of the listed ingredients, and in FIG. 8B, the same type of data, but, for substitute ingredients for two of the ingredients. FIG. 8A also shows a reference to the location of the table 800 in the electronic storage of the ingredient to nutrition computing module 201 and its interaction with the ingredient, recipe, nutrition, and ingredient substitution modules 206, 208, 210 and 218, respectively. FIG. 8B also shows a reference to the location of the table 800 in the electronic storage 220 of the ingredient to nutrition computing module 201 and its interaction with the ingredient, recipe, nutrition, and ingredient substitution modules 206, 208, 210 and 218, respectively.

As shown in FIGS. 8A-8B, column 1 lists the names of the ingredients 802 recommended in the recipe, with column 2 listing the ingredients' corresponding amounts. The remaining columns list the amount in grams of protein 806, carbohydrates 808, and total fat 810 for each ingredient. The last column lists the corresponding number of calories for the specified amount of ingredient. Rows 1 and 7 of FIG. 8A show that the recipe requires butter 814 and milk 816, in addition to the other listed ingredients. The table in FIG. 8B shows a modified almond cookie recipe in which margarine 818 (instead of the required butter 814 in the FIG. 8A recipe) and soy milk 820 (instead of the required milk 816 in the FIG. 8A recipe) are used. The last row 822 of the table in FIG. 8B shows the adjusted total weights for the recipe and the recalculated total amounts of protein, carbohydrates, total fat, and number of calories because of the butter and milk substitution using margarine and soy milk.

Figure 9:
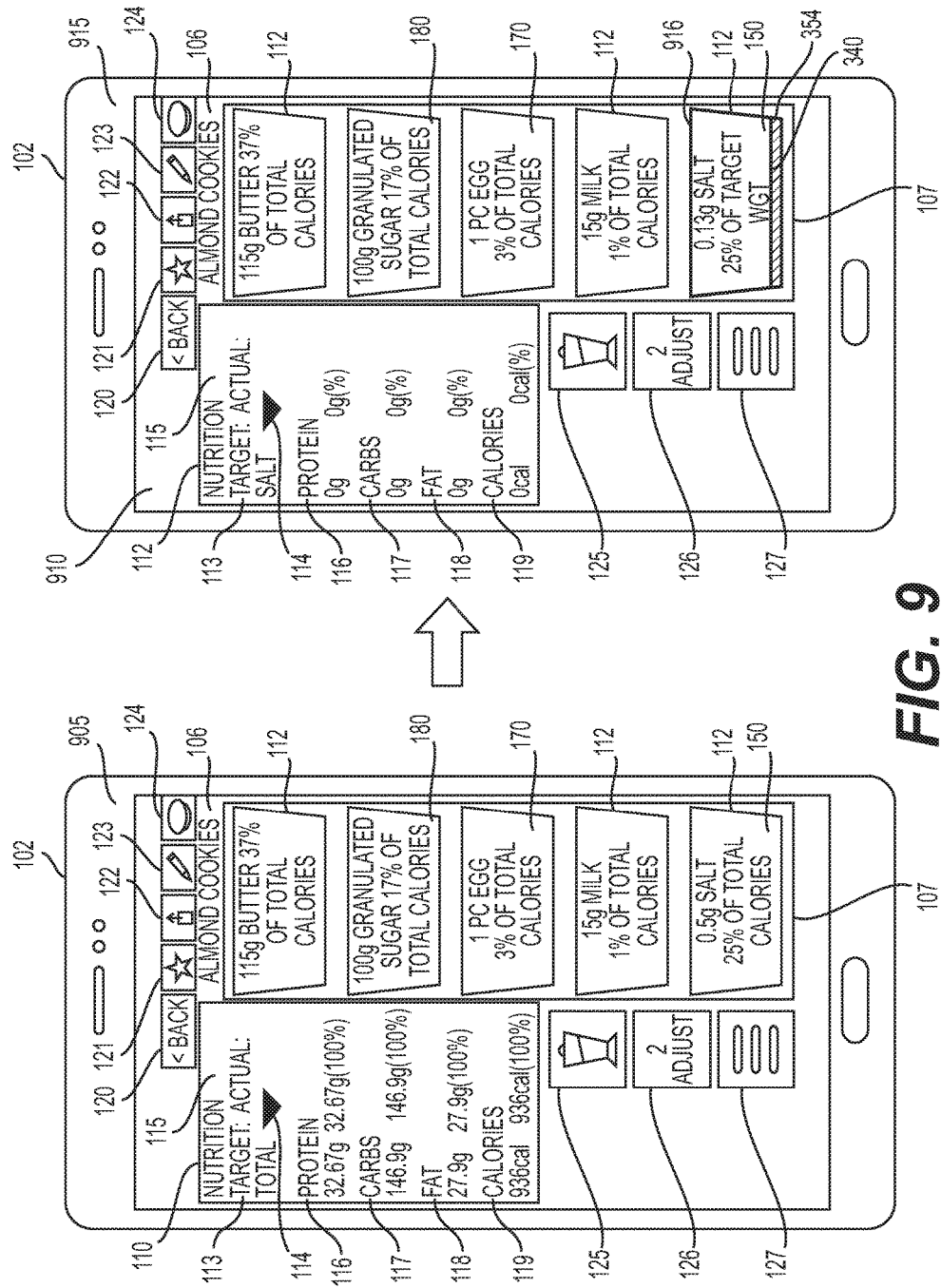
FIG. 9 is a schematic diagram of an illustrative computing system usable to provide the adjustment of an ingredient based on the amount of the ingredient added to the scale and the impact on a nutritional panel.

FIG. 9 is a schematic diagram of an illustrative computing system 900 usable to provide the adjustment of an ingredient based on the amount of the ingredient added to the scale 104 and the impact on the nutritional panel. Two displays 905 and 915 of the device 102 are shown, with the left-hand display 905 showing the recipe 106 and nutritional panel 110 before adding the salt ingredient, 150 and the right hand display 915 showing the recipe 106 and nutritional panel 110 after completing the adding operation for the salt ingredient 150. In the right-hand display 915, the fill line 340 which shows the intermediate weight of the salt ingredient 150 and the highlighted portion 354 illustrate a visual quantity within the recipe ingredient block 112 for the salt ingredient 150 added to the recipe 106. The approximate real time or real-time nature of the measurement on the scale 105 of the ingredients for the recipe 106 is therefore shown as a progression of measurements from the starting of the adding operation to the completion of the adding operation.

Each of the displays 905 and 915 are now be described based on the dynamic addition of the salt ingredient 150 to an actual amount 115 being less than the target amount 133. In addition, during the approximately real-time measurement by the scale 104 of the ingredient, the accumulating weight can be referenced as an intermediate weight (being shown in FIG. 9 as associated with the fill line 340), which upon confirmation of completion of adding the salt ingredient becomes the actual weight 115 based on an intermediate weight shown by the fill line 340. Intermediate weights as referred to herein can include one or more intermediate weights of individual ingredients (i.e., weight measurements on the scale 104), as well as intermediate weights of the combination of ingredients as the ingredients are being added together so that multiple intermediate weights can be accumulated to also provide the actual total weight of the recipe 106. The computing device 102 on the left includes a user interface 905 at a point just prior to executing recipe 106 for the salt ingredient 150 as the next ingredient to be added to the scale 104. In this example of the execution of recipe 106, 5 ingredients are shown on the recipe column 107 as the last 5 ingredients to be added to complete the recipe 106. Therefore, the remaining ingredients which are not shown, i.e., all purpose flour, whole wheat flour, almonds, almond extract and baking soda, are already measured. The nutritional panel 110 of this example user interface on display 905 shows the total recipe 106 nutrition or the target amount 113 as the accumulation of the nutritional data of protein 116, carbs 117, fat 118 and calories 119, for the previously added ingredients all-purpose flour, whole wheat flour, almonds, almond extract and baking soda. For example, the protein 116 accumulated for the total recipe 106 or target amount 113 is 32.67 g and includes the following protein 116 contributions from each of the previously added ingredients (with the values for each nutritional measurement being shown in FIGS. 6 and 8A), 9.71 g for all-purpose flour, 12.33 g for whole wheat flour, 10.63 g for almonds, 0 g for almond extract and 0 g for baking soda. The actual amount 115 also shows that for each of these previously added ingredients, the actual amount 115 measured by the scale 104 is the same as the target amount 113, so the same values are shown for each nutrient and the percentage in target amount 113 is 100% because the actual amount 115 is the same as the target amount 113. Also, in this example, there is no ingredient on the recipe column 107 that is currently being processed. Therefore, the nutritional panel 110 can default to the target amount 113 for the total recipe 106. In other examples, there can be other nutritional panel 110 default settings, such as the next ingredient to be added during recipe 106 execution.

FIG. 9 also shows computing device 102 on the right with a user interface 915 at a point in the execution of recipe 106 where the salt ingredient 150 is the current ingredient 150 being added to the scale 104. This can be indicated in a number of approaches, which can include the recipe ingredient block 112 block for the salt ingredient 150 being highlighted (as shown for recipe ingredient block 112 as 916) and/or the nutrition panel 910 being changed to indicate the salt ingredient 150, with the label "Salt" under the target amount 113 and to populate the target amount 113 with the data related to the salt ingredient 150. In this case, with the salt ingredient 150 having negligible nutrient values, the target amount 113 show as 0 g for both the target amount 113 and the actual amount 115 for protein, carbs, and fat, and 0 calories for both the target amount 113 and the actual amount 115 for calories. The user interface on display 915 also shows that the salt ingredient 150 is measured by the scale 104 to a value of 25% of the total weight of the salt ingredient 150, as shown by the highlighted portion 354. At this point in the recipe 106 execution, the scale 104 has measured an amount of the salt ingredient 150 at 25% of the total weight. It also is notable in this example, that the recipe ingredient blocks 112 in a default state show for each ingredient the target amount weight of the ingredient and the percentage contribution of the ingredient to the total calories for the recipe 106. The FIG. 9 user interface on display 915 also shows that recipe ingredient block 112 for the selected salt ingredient 150 changes the percentage of the total calories to the percentage of target weight to assist a user to more readily determine the weight of the ingredient as it accumulates. An additional indication of the scale 104 measurement is shown by the fill line 340 moving upward with the highlighting portion occupying an increasing volume of the recipe ingredient block 112 to further demonstrate the ingredient addition and aid the user as to when the user is close to meeting the target amount and therefore should stop adding the salt ingredient 150. FIG. 9 also shows an intermediate weight of the salt ingredient 150 of 25% of the total weight or 0.13 g of salt. At this point, there can be several approaches to identifying the 25% amount as the final amount, including for example, requesting that the user confirm that final amount or a time out feature. The process by which the completion of an ingredient amount is signaled can include other data entry, visual, textual, audio, or similar, approaches which are included within the scope of this invention. In this example, based on any one of these approaches, the full amount of the salt ingredient 150 is 25% of the total weight or the weight of the target amount 113 for the recipe 106.

Figure 10A:
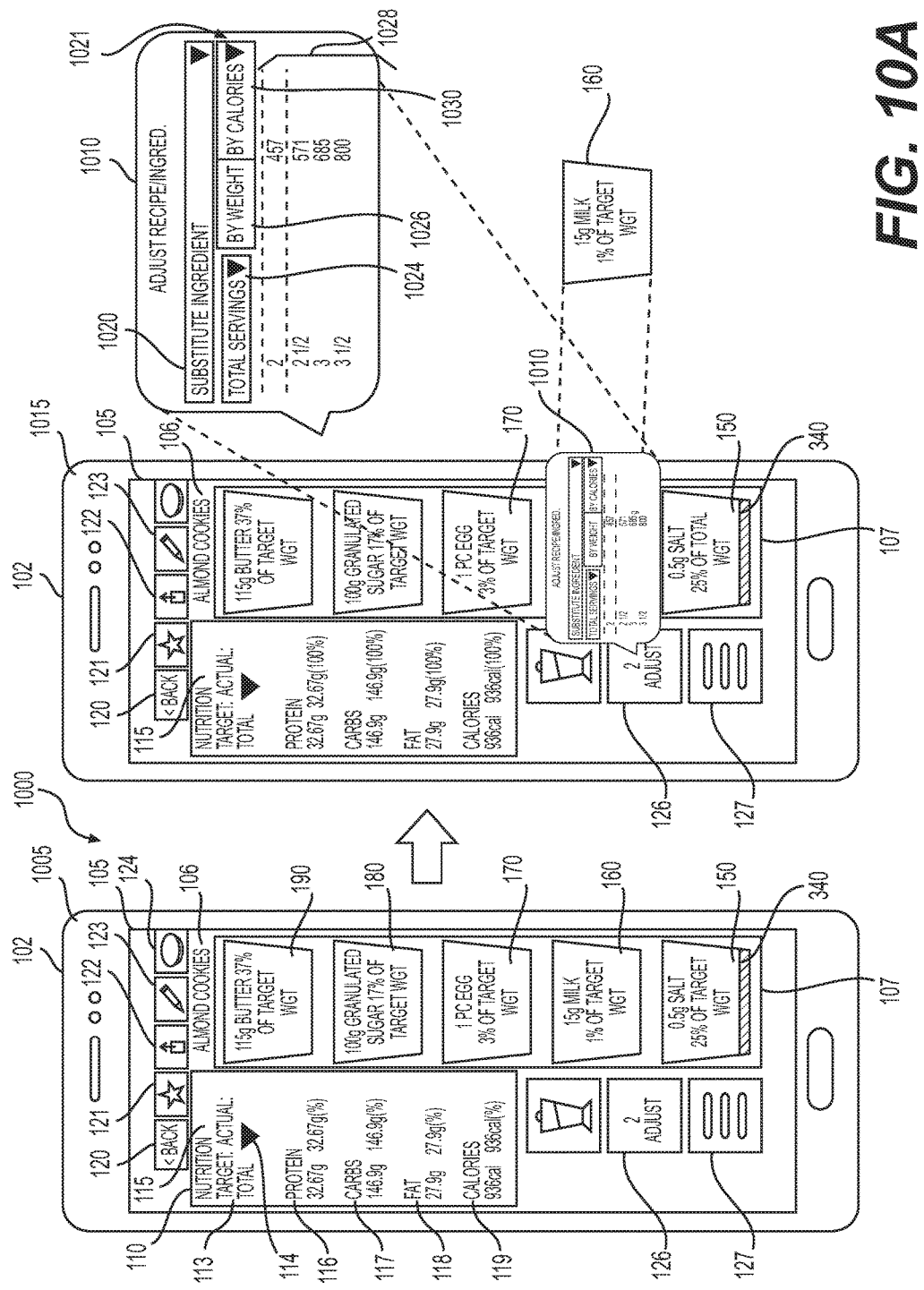
FIGS. 10A-10D are schematic diagrams of an illustrative computing environment usable to show the additional of particular ingredients for the recipe.

The example of the recipe 106 in FIG. 3 is now further described for the next ingredient, the milk ingredient 160. FIGS. 10A-10D are a schematic diagram of an illustrative computing system 1000 usable to provide the adjustment of an ingredient based on a selection of a substitute ingredient as well as to display the amount of the ingredient added to the scale 104 and the impact on the nutritional panel. FIG. 10A follows from FIG. 9 in that the adding operation for the salt ingredient 150 is completed. In FIG. 10A, the nutritional panel 110 has defaulted again and the milk ingredient 160 is the current ingredient 150 being added to the scale 104. Two displays 1005 and 1010 of the device 102 are shown, with the left-hand display 1005 showing the recipe 106 and nutritional panel 110 after adding the salt ingredient 150 but before adding the milk ingredient 160. As in the FIG. 9 example, the default of the nutritional panel 110 is the same as that shown in FIG. 9 with the nutritional panel 110 of this example user interface 1005 showing the total recipe 106 nutrition or the target amount 113 as the accumulation of the nutritional data of protein 116, carbs 117, fat 118 and calories 119, for the previously added ingredients all-purpose flour, whole wheat flour, almonds, almond extract and baking soda. FIG. 10A also shows computing device 102 on the right with a user interface 1015 at a point in the execution of recipe 106 where the milk ingredient 160 is highlighted as the next ingredient for recipe 106 execution (as shown by the recipe ingredient block 112 for the milk ingredient 160 with a darker line for the figure) and the Adjust button 126 is activated to trigger an expansion of this option by an adjust panel 1010 labeled "Adjust Recipe/Ingred.," also shown enlarged for clarity. The recipe ingredient block 112 for the milk ingredient 160 is shown on the right of the device 1015 as it is covered by the adjust panel 1010. The adjust panel 1010 can include the following data entry fields: substitute ingredient 1020, recipe or ingredient 1024 (currently showing "Total Servings"), measurement 1021 including weight toggle 1026 and nutrients 1030 (currently showing "Calories"). The adjust panel 1010 also can include a display 1028 showing measurements associated with the recipe or ingredient listing 1024 and the measurement listings panel 1021. As shown in FIG. 10A, the substitute ingredient 1020 data entry field provides data entry selections or input to replace the current ingredient with a substitute ingredient. The recipe or ingredient 1024 data entry field provides a data selection activated by the arrow shown to adjust ingredients of the recipe, as well as the total recipe in the form of scaling the total recipe. The measurement 1021 data entry field includes a toggle to show nutrients by weight 1026 and a nutrient 1030 listing (currently showing "By Calories"). The nutrient 1030 data entry field provides a data selection activated by the arrow shown to adjust the selections of nutrients to show on the panel 1010. The user selections for the recipe or ingredient 1024 and the nutrient 1030 listings are the basis for the type of data presented in the display 1028. The data underneath the recipe or ingredient 1024 data entry field relates to the selection in that data entry field (for example, servings are shown as related to the total servings, and the current selection for servings is shown in the adjust button 126). The data underneath the nutrient 1030 data entry field relates to the weight 1026 and nutrient 1030 data entry fields.

Figure 10B:
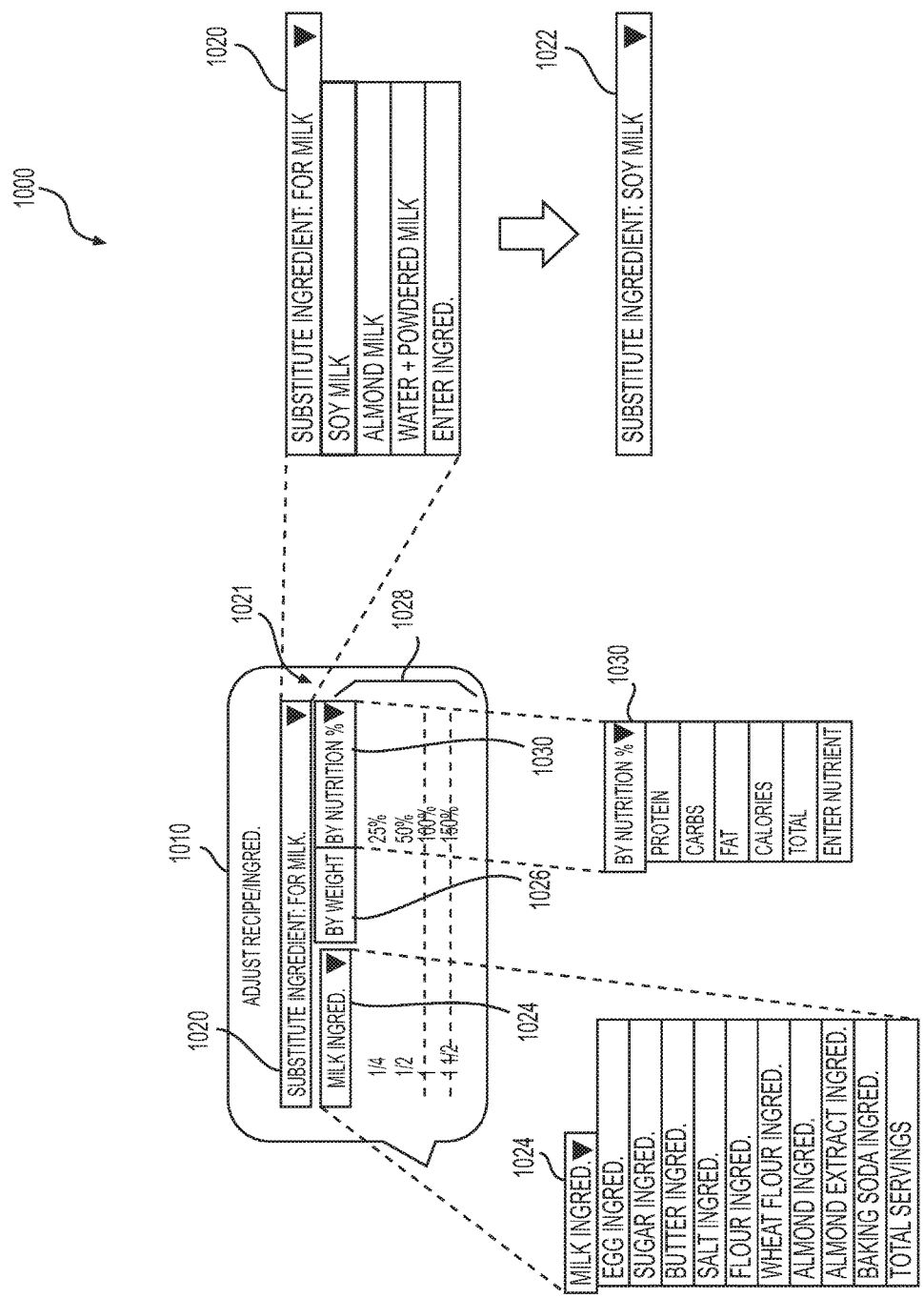
Figure 10C:
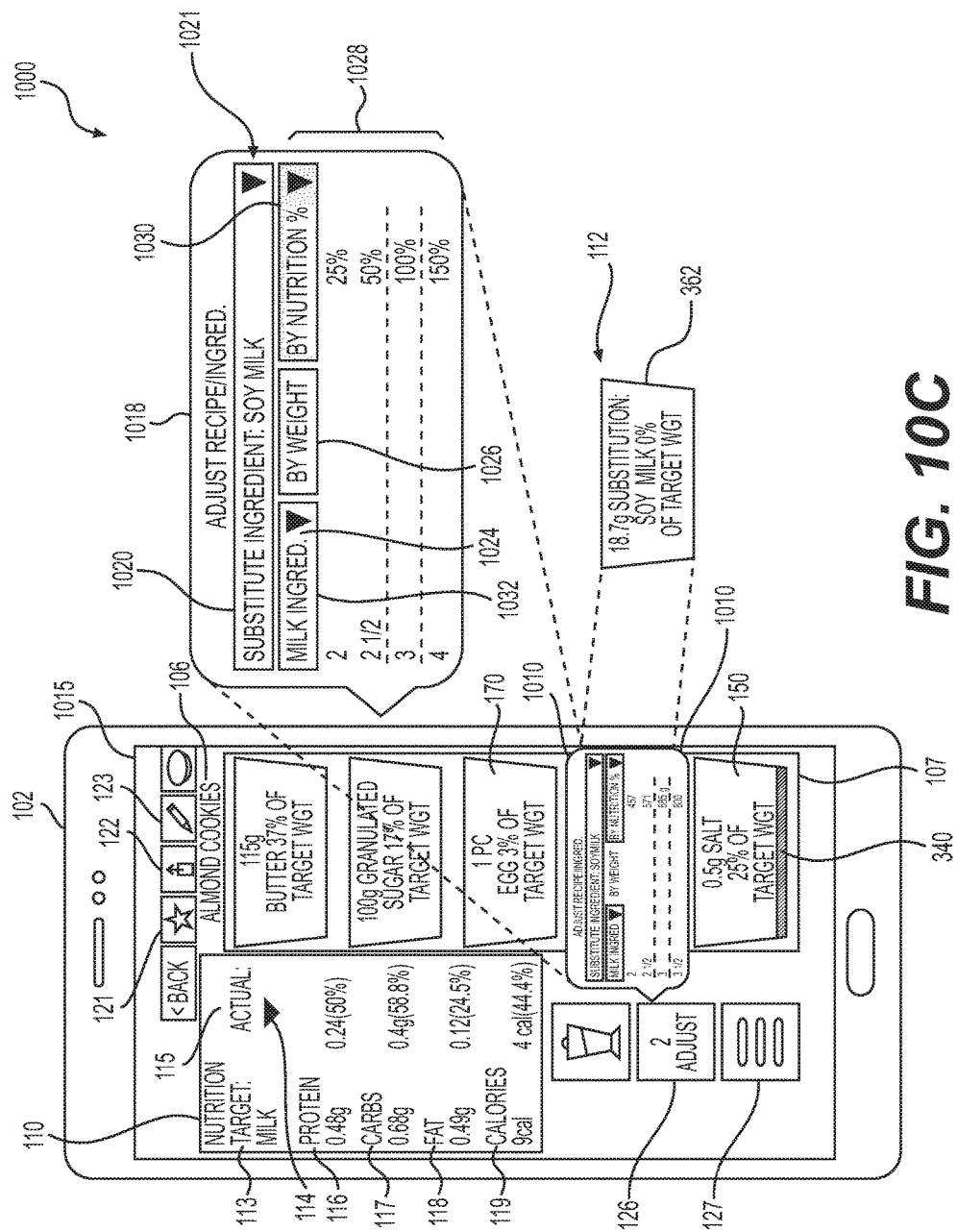

FIG. 10B is a schematic diagram of an illustrative computing environment usable to show the expansion of the "Adjust Recipe/Ingred." panel 1010 and the further expansion of the following panel 1010 data entry fields: substitute ingredient 1020, recipe or ingredient 1024, weight 1026 and nutrient 1030, with the arrow icon in each of the data entry fields activated to show the data entry and input selections. For the substitute ingredient 1020 data entry field, the alternative ingredients shown in FIG. 7 are options for selections, shown in this example as "Soy Milk" in data entry option 1022, or the user can be prompted to enter a new substitute ingredient. For the recipe or ingredient 1024 data entry fields, the arrow icon is activated to show the option including for the Total servings or any of the recipe 106 ingredients (as also shown in FIG. 3B data entry field 114. The data entry field 1030 also is shown, the arrow icon activated to show the options including the nutrients shown in the nutritional panel 110, as well as the option for the user to enter a nutrient. As a result of the FIG. 10B data selection received by the display 1020 of "Soy Milk," the milk ingredient 160 has been replaced by a substitution ingredient soy milk, as shown in display 1022.

FIG. 10O follows from FIG. 10B in that the milk ingredient 160 has been replaced by a substitution ingredient soy milk, as shown in the soy milk selection 1022. The nutritional panel 110 has changed to the milk ingredient 160 as the current ingredient 150 being added to the scale 104. The nutritional panel 110 of this example user interface 1015 now shows milk in the data entry field 114 and as the milk ingredient is now the current ingredient, the actual amount 115 entries are showing 0 as the ingredient has not yet been added for measurement by the scale 104. In addition, with the selection of soy milk as a substitute ingredient 362, the recipe ingredient block 112 now shows the soy milk ingredient 362 (and changes from a measurement of the percentage of total calories to a percentage of total weight). In this example, the listing of milk is maintained and the target amount 113 will be that of the nutritional information for the milk ingredient, so that the comparison is presented to the user throughout the process of making the recipe. In other examples, the soy milk ingredient 362 can be listed instead of the milk listing in the data entry field 114 and the target amount 113 can be for the soy milk ingredient 362 instead. There are a number of options for data presentation of the original ingredient and the substitute ingredient, as within the scope of this invention.

Figure 10D:
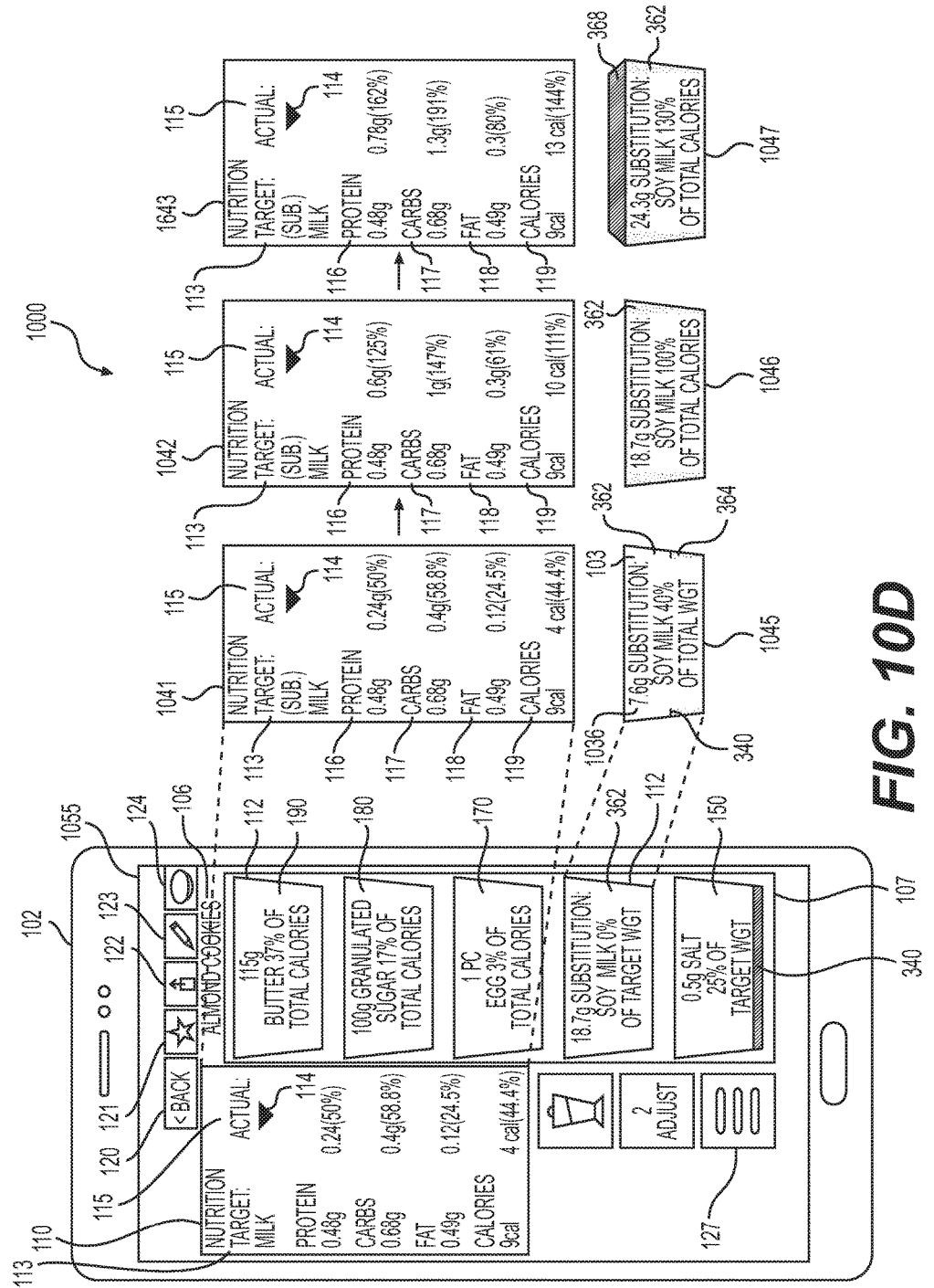

FIG. 10D follows from FIG. 10O in that the soy milk ingredient 362 is added to the container 130 measured on the scale 104. The recipe ingredient block 112 for the soy milk ingredient 362 is shown on the display 1055 and also in a series of recipe ingredient blocks 1045, 1046 and 1047 with respective updates to nutritional panels 1041, 1042 and 1043, which show successive stages during the approximately real time measurement of the soy milk ingredient 362 addition to the scale 104. During the progression of adding the soy milk ingredient 362 to the container 130 on the scale 104, the series of recipe ingredient blocks and their respective nutritional panels present the changes in the data based on the scale 104 detecting accumulating amounts of the soy milk ingredient 362, with the amounts measured prior to the completion of the addition of the soy milk ingredient 362 being intermediate weights of the ingredient being added. For example, on the display 1055, milk is the listed ingredient in the data entry field 114 (as described for FIG. 10O above) and the actual amount 115 entries are showing "0" (as well as no percentage value), as the ingredient has not yet been added for measurement by the scale 104. Then, in recipe ingredient block 1045, 40% of the target weight has been added, with the fill line 340 showing the current amount (or the intermediate amount or weight of the soy milk ingredient 362) as well as the highlighted portion 364 showing the amount added and the portion 1036 showing the amount yet to be added to achieve the target amount 113. In addition, the nutritional panel 1041 presents the nutritional information for the milk ingredient 160 as the target amount 113 and the actual amount 115 depicts the weight and therefore corresponding nutritional information for the soy milk ingredient 362. The percentage shown for the actual can include the percentage of the target or milk ingredient 160 represented by the soy milk ingredient 362. As a result, the display can provide a direct comparison between the original ingredient 160 and the substitute ingredient 362. Recipe ingredient block 1046 and nutritional panel 1042 then shown the amount for the soy ingredient at the target amount 113 of the milk ingredient and the corresponding data. Finally, the recipe ingredient block 1047 and nutritional panel 1043 then show the amount for the soy ingredient at above the target amount 113 shown on the nutritional panel 1043. The substitution for example has resulted in changes to the nutritional data compared to the original ingredient, such as for example, the protein of the substitute soy milk ingredient 362 is 162% of the milk ingredient 160 and the fat of the substitute soy milk ingredient 362 is 80% of the milk ingredient 160. The recipe ingredient block 1043 also shows a highlighted portion of the amount of the soy milk ingredient 368 exceeding the milk ingredient 160 target amount 113. The FIGS. 9 and 10A-10D examples therefore present the dynamic substitution and adjustment of a combination of ingredients of recipe 106 and present the nutritional data about the adjusted ingredients and impact on the full nutritional information for the recipe. The example in these FIGS. 9 and 10A-10D include the variety of types of recipe ingredient adjustments that are available, including adding more or less than the target amount 113, as well as substituting ingredients.

CONCLUSION

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system comprising:
   a scale;
   a computing device having at least one processor, at least one user interface and a memory; and
   the memory including computer-executable instructions that, when executed by the at least one processor, cause the at least one processor to:
   receive a recipe, the recipe indicating at least two ingredients and a total nutritional data, the recipe including a first ingredient of the at least two ingredients having a first weight and a first nutritional data, and the recipe including a second ingredient of the at least two ingredients having a second weight and a second nutritional data;
   receive, from the scale, a first intermediate weight measurement of the first ingredient based upon an addition of a first amount of the first ingredient to the scale, the first intermediate weight measurement being one of less than or more than the first weight;
   generate a first intermediate nutritional data, the first intermediate nutritional data based, at least in part, on the first intermediate weight measurement of the first ingredient and the first nutritional data;
   generate a total intermediate nutritional data, the total intermediate nutritional data based, at least in part, on a difference between the first weight and the first intermediate weight measurement of the first ingredient;
   receive, from the scale, a second intermediate weight measurement of the second ingredient based upon an addition of a second amount of the second ingredient to the scale, the second intermediate weight measurement being one of less than or more than the second weight;
   generate a second intermediate nutritional data, the second intermediate nutritional data based, at least in part, on the second intermediate weight measurement of the second ingredient and the second nutritional data;
   update the total intermediate nutritional data, the update based, at least in part, on a difference between the second weight and the second intermediate weight measurement of the second ingredient; and
   render, on the user interface, (i) a first display indicating the first intermediate nutritional data and the total intermediate nutritional data, and (ii) a second display indicating the second intermediate nutritional data and the first display further indicating the update to the total intermediate nutritional data.

2. The system of claim 1, the first display further indicating at least one of (i) the first intermediate weight measurement, (ii) a difference between the first weight and the first intermediate weight measurement, (iii) the second intermediate weight measurement, (iv) a difference between the second weight and the second intermediate weight measurement, or (v) the total nutritional data.

3. The system of claim 2, the first intermediate weight measurement being displayed as a percentage of the first weight, and the second intermediate weight measurement being displayed as a percentage of the second weight.

4. The system of claim 1, the second intermediate weight being equal to the second weight, and the total intermediate nutritional data is based on the first intermediate weight measurement and the second weight.

5. The system of claim 1, the first display and the second display being different portions of a single display, separate displays being activated independent of one another, or the second display being activated by a component of the first display.

6. The system of claim 1, at least one of the first intermediate nutritional data, the second intermediate nutritional data or the total intermediate nutritional data including one or more of text, or a plurality of one of alphanumeric characters, numeral characters, graphics, scales depictions, charts, visual indications, audio indications, video indications, or photographic indications.

7. A system comprising:
a scale;
a computing device having at least one processor, at least one user interface and a memory; and
the memory including computer-executable instructions that, when executed by the at least one processor, cause the at least one processor to:
receive a recipe, the recipe indicating at least a first ingredient, a second ingredient, and a total nutritional data, the recipe including a first weight for the first ingredient and a first nutritional data for the first ingredient;
receive a substitute ingredient for the first ingredient, the substitute ingredient having a substitute nutritional data;
determine a substitute weight based, at least in part, on the first weight;
generate a substitute intermediate nutritional data, the substitute intermediate nutritional data based, at least in part, on the substitute weight;
generate a total intermediate nutritional data, the total intermediate nutritional data based, at least in part, on the substitute weight; and
receive, from the scale, a substitute intermediate weight measurement of the substitute ingredient based upon an addition of an amount of the substitute ingredient to the scale;
update the total intermediate nutritional data, the update based, at least in part, on a difference between the substitute weight and the substitute intermediate weight measurement of the substitute ingredient; and
render, on the user interface, a first display indicating the substitute intermediate nutritional data and the total intermediate nutritional data, and further indicating the update to the total intermediate nutritional data.

8. The system of claim 7, the first display further indicating at least one of the substitute intermediate weight measurement, a difference between the substitute weight and the substitute Intermediate weight measurement, a difference between the substitute intermediate weight measurement and the first weight or the total nutritional data.

9. The system of claim 7, the substitute intermediate weight measurement being displayed as a percentage of one of the substitute weight or the first weight.

10. The system of claim 7, the recipe further indicating a second ingredient of the at least two ingredients, the second ingredient having a second weight and a second nutritional data, wherein the computer-executable instructions further cause the at least one processor to:
receive, from the scale, a second intermediate weight measurement of the second ingredient;
generate a second intermediate nutritional data, the second intermediate nutritional data based, at least in part, on the second intermediate weight measurement and the second nutritional data;
update the total intermediate nutritional data, the update based, at least in part, on a difference between the second weight and the second intermediate weight measurement; and
render, on the user interface, a second display indicating the second intermediate nutritional data and the first display further indicating the update to the total intermediate nutritional data.

11. The system of claim 10, the second display further indicating at least one of the second intermediate weight measurement, a difference between the second weight and the second intermediate weight measurement or the total nutritional data.

12. The system of claim 10, the second intermediate weight measurement being displayed as a percentage of the second weight.

13. The system of claim 10, the first display and the second display being different portions of a single display, separate displays being activated independent of one another or the second display being activated by a component of the first display.

14. The system of claim 10, at least one of the first intermediate nutritional data, the second intermediate nutritional data or the total intermediate nutritional data including one or more of text, or a plurality of one of alphanumeric characters, numeral characters, graphics, scales depictions, charts, visual indications, audio indications, video indications, or photographic indications.

15. A method comprising:
receiving a recipe, the recipe indicating at least two ingredients and a total nutritional data, the recipe including a first ingredient of the at least two ingredients having a first weight and a first nutritional data, and the recipe including a second ingredient of the at least two ingredients having a second weight and a second nutritional data;
receiving, from the scale, a first intermediate weight measurement of the first ingredient based upon an addition of a first amount of the first ingredient to the scale, the first intermediate weight measurement being one of less than or more than the first weight;
generating a first intermediate nutritional data, the first intermediate nutritional data based, at least in part, on the first intermediate weight measurement of the first ingredient and the first nutritional data;
generating a total intermediate nutritional data, the total intermediate nutritional data based, at least in part, on a difference between the first weight and the first intermediate weight measurement;
receiving, from the scale, a second intermediate weight measurement of the second ingredient based upon an addition of a second amount of the second ingredient to the scale, the second intermediate weight measurement being one of less than or more than the second weight;
generating a second intermediate nutritional data, the second intermediate nutritional data based, at least in part, on the second intermediate weight measurement of the second ingredient and the second nutritional data;
updating the total intermediate nutritional data, the update based, at least in part, on a difference between the second weight and the second intermediate weight measurement of the second ingredient
rendering, on the user interface, (i) a first display indicating the first intermediate nutritional data and the total intermediate nutritional data, and (ii) a second display indicating the second intermediate nutritional data and the first display further indicating the update to the total intermediate nutritional data.

16. The method as recited in claim 15, the first display further indicating at least one of (i) the first intermediate weight measurement, (ii) a difference between the first weight and the first intermediate weight measurement, (iii) the second intermediate weight measurement, (iv) a difference between the second weight and the second intermediate weight measurement, or (v) the total nutritional data.

* * * * *